(12) United States Patent
Lassalle-Balier

(10) Patent No.: US 10,557,726 B2
(45) Date of Patent: Feb. 11, 2020

(54) SYSTEMS AND METHODS FOR REDUCING ANGLE ERROR FOR MAGNETIC FIELD ANGLE SENSORS

(71) Applicant: Allegro MicroSystems, LLC, Manchester, NH (US)

(72) Inventor: Rémy Lassalle-Balier, Bures sur Yvette (FR)

(73) Assignee: Allegro MicroSystems, LLC, Manchester, NH (US)

( * ) Notice: Subject to any disclaimer, the term of this patent is extended or adjusted under 35 U.S.C. 154(b) by 0 days.

(21) Appl. No.: 15/884,619

(22) Filed: Jan. 31, 2018

(65) Prior Publication Data

US 2019/0234764 A1  Aug. 1, 2019

(51) Int. Cl.
*G01D 5/16* (2006.01)

(52) U.S. Cl.
CPC ..................... *G01D 5/16* (2013.01)

(58) Field of Classification Search
CPC ..... G01D 5/145; G01D 5/24414; G01D 5/165
See application file for complete search history.

(56) References Cited

U.S. PATENT DOCUMENTS

| | | | |
|---|---|---|---|
| 9,880,026 B1 | 1/2018 | Eagen et al. | |
| 2002/0191451 A1* | 12/2002 | Kishi | B82Y 25/00 365/200 |
| 2005/0128654 A1* | 6/2005 | Sapozhnikov | B82Y 25/00 360/324.12 |
| 2006/0267581 A1* | 11/2006 | Wiese | G01D 5/14 324/207.25 |
| 2009/0189601 A1* | 7/2009 | Okada | B82Y 25/00 324/207.21 |
| 2010/0073827 A1* | 3/2010 | Zhao | B82Y 10/00 360/324.2 |

(Continued)

FOREIGN PATENT DOCUMENTS

| | | | |
|---|---|---|---|
| DE | 102015218855 | 3/2017 | |
| DE | 102015218855 A1 * | 3/2017 | ............. G01B 21/22 |
| EP | 2674728 14 | 12/2013 | |

OTHER PUBLICATIONS

Search Report and Written Opinion dated Mar. 14, 2019 for PCT No. PCT/US2018/066995; 13 pages.

*Primary Examiner* — Alvaro E Fortich
(74) *Attorney, Agent, or Firm* — Daly, Crowley, Mofford & Durkee LLP

(57) ABSTRACT

A magnetic field angle sensor is provided having two or more bridge structures of magnetoresistance elements, with each bridge structure configured to measure a projection of a magnetic field along a different axis such that an angle of direction of the magnetic field can be measured with greater accuracy. The angle sensor includes a first bridge structure configured to generate a first sinusoidal signal indicative of the magnetic field along a first axis and a first cosinusoidal signal indicative of the magnetic field along a second axis that is orthogonal with respect to the first axis and a second bridge structure configured to generate a second sinusoidal signal indicative of the magnetic field along a third axis and a second cosinusoidal signal indicative of the magnetic field along a fourth axis that is orthogonal with respect to the third axis, wherein an angle between the first axis and the third axis is a factor of 90°.

24 Claims, 11 Drawing Sheets

(56) References Cited

U.S. PATENT DOCUMENTS

| | | | | |
|---|---|---|---|---|
| 2010/0271013 A1* | 10/2010 | Servel | .................... | G01D 5/145 |
| | | | | 324/207.21 |
| 2010/0301845 A1* | 12/2010 | Acker | ................ | B62D 15/0215 |
| | | | | 324/207.25 |
| 2011/0037459 A1* | 2/2011 | Okada | .................... | G01D 5/145 |
| | | | | 324/207.25 |
| 2011/0285395 A1* | 11/2011 | van Veldhoven | ...... | G01R 33/09 |
| | | | | 324/252 |
| 2013/0113478 A1* | 5/2013 | Pant | .................... | G01R 33/093 |
| | | | | 324/252 |
| 2013/0335070 A1* | 12/2013 | Abe | ........................ | G01B 7/30 |
| | | | | 324/207.13 |

* cited by examiner

SYSTEMS AND METHODS FOR REDUCING ANGLE ERROR FOR MAGNETIC FIELD ANGLE SENSORS

BACKGROUND

Magnetic field sensors are used in a variety of applications, including, but not limited to, an angle sensor that senses an angle of a direction of a magnetic field, a current sensor that senses a magnetic field generated by a current carried by a current-carrying conductor, a magnetic switch that senses the proximity of a ferromagnetic object, a rotation detector that senses passing ferromagnetic articles, for example, magnetic domains of a ring magnet or a ferromagnetic target (e.g., gear teeth) where the magnetic field sensor is used in combination with a back-biased or other magnet, and a magnetic field sensor that senses a magnetic field density of a magnetic field.

Various parameters characterize the performance of magnetic field sensors and magnetic field sensing elements. With regard to magnetic field sensing elements, the parameters include sensitivity, which is the change in the output signal of a magnetic field sensing element in response to a magnetic field, and linearity, which is the degree to which the output signal of a magnetic field sensor varies linearly (i.e., in direct proportion) to the magnetic field.

Some magnetic field sensors include magnetoresistance (MR) elements, such as giant magnetoresistance (GMR) elements and tunneling magnetoresistance (TMR). Generally, GMR and TMR elements have a relatively high sensitivity compared, for example, to Hall effect elements. GMR and TMR elements have moderately good linearity, but over a restricted range of magnetic fields. However, even in the restricted range of magnetic fields, the linearity of the GMR or TMR element can suffer from irregularities, such as due to high temperatures.

Further, angle sensors using GMR and TMR elements can experience angle error due to phenomena such as spin flop (i.e., alteration of reference direction at high magnetic fields or anisotropy field (e.g., magnetocrystalline anisotropy or shape anisotropy)). For example, the angle obtained with GMR elements can experience error up to several degrees.

SUMMARY

In accordance with the concepts, systems, methods and techniques described herein, a magnetic field angle sensor is provided having two or more bridge structures of magnetoresistance elements, with each bridge structure configured to measure a projection of a magnetic field along a different axis such that an angle of direction of the magnetic field can be measured with greater accuracy by reducing the effects of phenomena such as, but not limited to, spin flop and/or anisotropy.

Each of the bridge structures can include a first plurality of magnetoresistance elements disposed relative to a first axis and a second plurality of magnetoresistance elements disposed relative to a second axis. A signal can be generated indicative of the magnetic field signal along each axis and the signals from each bridge structure can be averaged to generate an output signal indicative of a direction of the magnetic field signal. In some embodiments, the reduction in error of the output signal can correspond to the number of bridge structures.

Each of the axes within a bridge structure can be spaced from each other at predetermined angles. For example, in some embodiments, an angle between a first axis and second axis of a first bridge structure can be approximately 90° and an angle between a third axis and a fourth axis of a second, different bridge structure can be approximately 90°.

In some embodiments, the second bridge structure (or any other bridge structure in the angle sensor) can be titled by an angle (referred to herein as a tilt angle) with respect to the first bridge structure and each of the axes of the respective bridge structures can be spaced from each other at predetermined angles. For example, a tilt angle between the first references axis of the first bridge structure and third references axis of the second bridge structure greater can be a factor of 90°, such as 45°. The tilt angle between axes of different bridge structures can vary at least based in part on the number of bridge structures in the respective angle sensor. For example, in some embodiments, the tilt angle between axes of different bridge structures can include any angle between about −90° to about 90°.

An angle error of the angle sensor output signal can be reduced by a factor corresponding to the number of bridge structures. For example, the angle error of an output produced by each bridge structure can be periodic. Additional bridge structures can be titled with respect to each other at predetermined angles such that their angle error is opposite with respect to each other. Thus, by averaging or combining signals from multiple bridge structures, the angle error can be reduced by a factor based at least in part on the number of bridge structures in the angle sensor.

In some embodiments, the angle error can be reduced by modifying (e.g., increasing) the pinning of a layer (e.g., reference layer) of one or more magnetoresistance elements of a bridge structure. For example, as the pinning of a layer of the one or more magnetoresistance elements of a particular bridge structure increases, the angle error of the bridge structure decreases. Thus, by increasing the pinning of the reference layer of one or more magnetoresistance elements of a particular bridge structure, the error angle can be further reduced.

Each bridge structure can include a sine bridge disposed along a first axis and a cosine bridge disposed along a second axis. The sine bridge can measure the sine of the magnetic field relative to the first axis and generate a sinusoidal signal indicative of the magnetic field along the first axis and the cosine bridge can measure the cosine of the magnetic field relative to the second axis and generate a cosinusoidal signal indicative of the magnetic field along the second, different axis. Thus, the bridge structures described herein can generate a sinusoidal signal and a cosinusoidal signal corresponding the magnetic field.

Each bridge structure can include a plurality of magnetoresistance elements. The magnetoresistance elements may include one or more of giant magnetoresistance (GMR) elements, anisotropic magnetoresistance (AMR) elements, tunneling magnetoresistance (TMR) elements or magnetic tunnel junction (MTJ) elements.

In a first aspect, a magnetic field angle sensor to detect a direction of a magnetic field includes a first bridge structure configured to generate a first sinusoidal signal indicative of the magnetic field along a first axis and a first cosinusoidal signal indicative of the magnetic field along a second axis that is orthogonal with respect to the first axis and a second bridge structure configured to generate a second sinusoidal signal indicative of the magnetic field along a third axis and a second cosinusoidal signal indicative of the magnetic field along a fourth axis that is orthogonal with respect to the third axis, wherein an angle between the first axis and the third axis is a factor of 90°.

The angle between the first axis and the third axis can be approximately 45°. In some embodiments, the magnetic field angle sensor includes a substrate supporting the first and second bridge structures.

The magnetic field angle sensor can include a circuit responsive to the first sinusoidal signal, the first cosinusoidal signal, the second sinusoidal signal, and the second cosinusoidal signal for computing an output signal indicative of the direction of the magnetic field. The circuit can include an arctangent processor to compute a first arctangent of the first sinusoidal signal and the first cosinusoidal signal and to compute a second arctangent of the second sinusoidal signal and the second cosinusoidal signal. The circuit can further include a differencing element configured to subtract the angle between the first axis and the third axis from the second arctangent to generate a third arctangent. The circuit can include a summing element configured to compute a mean value of the first arctangent and the third arctangent in order to provide the output signal indicative of the direction of the magnetic field.

The magnetic field angle sensor can include a third bridge structure configured to generate a third sinusoidal signal indicative of the magnetic field along a fifth axis and a third cosinusoidal signal indicative of the magnetic field along a sixth axis that is orthogonal with respect to the fifth axis and a fourth bridge structure configured to generate a fourth sinusoidal signal indicative of the magnetic field along a seventh axis and a fourth cosinusoidal signal indicative of the magnetic field along an eighth axis that is orthogonal with respect to the seventh axis. The angle between the first axis and the third axis can provide a first angle, a second angle between the fifth axis and the first axis is a factor of 90°, a third angle between the seventh axis and the first axis is a factor of 90°. In an embodiment, the first angle, the second angle and the third angle are different angles.

In some embodiments, the first angle can be approximately 45°, the second angle can be approximately 22.5°, and the third angle can be approximately 67.5°.

The first bridge structure can include a first plurality of magnetoresistance elements oriented to sense the magnetic field along the first axis and a second plurality of magnetoresistance elements oriented to sense the magnetic field along the second axis, and the second bridge structure can include a third plurality of magnetoresistance elements oriented to sense the magnetic field along the third axis and a fourth plurality of magnetoresistance elements oriented to sense the magnetic field along the fourth axis.

The first, second, third, and fourth, pluralities of magnetoresistance elements comprise one or more of giant magnetoresistance (GMR) elements, anisotropic magnetoresistance (AMR) elements, tunneling magnetoresistance (TMR) elements or magnetic tunnel junction (MTJ) elements.

Each of the first, second, third, and fourth pluralities of magnetoresistance elements comprise a reference layer and a free layer and a pinning (or pinning factor) of the reference layer can range from about 1 kOe to about 3 kOe (e.g., about 1.2 kOe to about 2.5 kOe). It should be appreciated however that the pinning (or pinning factor) of the reference layer can vary based at least in part on an application of the angle sensor. For example, in some embodiments, the pinning (or pinning factor) of the reference layer can be less than 1 kOe or greater than 3 kOe.

In another aspect, a method for detecting a direction of a magnetic field, the method includes generating a first sinusoidal signal indicative of the magnetic field along a first axis and a first cosinusoidal signal indicative of the magnetic field along a second axis that is orthogonal with respect to the first axis, and generating a second sinusoidal signal indicative of the magnetic field along a third axis and a second cosinusoidal signal indicative of the magnetic field along a fourth axis that is orthogonal with respect to the third axis. An angle between the first axis and the third axis can be a factor of 90°.

In an embodiment, the angle between the first axis and the third axis can be approximately 45°.

The method may include computing the direction of the magnetic field in response to the first sinusoidal signal, the first cosinusoidal signal, the second sinusoidal signal, and the second cosinusoidal signal. In some embodiments, computing the direction of the magnetic field includes determining a first arctangent of the first sinusoidal signal and the first cosinusoidal signal, and determining a second arctangent of the second sinusoidal signal and the second cosinusoidal signal.

Computing the direction of the magnetic field can include subtracting the angle between the first axis and the third axis from the second arctangent to generate a third arctangent. In some embodiments, computing the direction of the magnetic field can include calculating a mean value of the first arctangent and the third arctangent in order to provide an output signal indicative of the direction of the magnetic field.

The method may further include generating a third sinusoidal signal indicative of the magnetic field along a fifth axis and a third cosinusoidal signal indicative of the magnetic field along a sixth axis that is orthogonal with respect to the fifth axis, and generating a fourth sinusoidal signal indicative of the magnetic field along a seventh axis and a fourth cosinusoidal signal indicative of the magnetic field along an eighth axis that is orthogonal with respect to the seventh axis. The angle between the first axis and the third axis can provide a first angle, a second angle between the fifth axis and the first axis is a factor of 90°, a third angle between the seventh axis and the first axis is a factor of 90°. In an embodiment, the first angle, the second angle and the third angle can be different angles.

In some embodiments, the first angle can be approximately 45°, the second angle can be approximately 22.5°, and the third angle can be approximately 67.5°.

The method can further include generating the first sinusoidal signal comprises sensing the magnetic field along the first axis with a first plurality of magnetoresistance elements of a first bridge structure, and generating the first cosinusoidal signal comprises sensing the magnetic field along the second axis by a second plurality of magnetoresistance elements of the first bridge structure. The second plurality of magnetoresistance elements can be positioned orthogonally with respect to the first plurality of magnetoresistance elements.

The method can include generating the second sinusoidal signal comprises sensing the magnetic field along the third axis by a third plurality of magnetoresistance elements of a second bridge structure, and generating the second cosinusoidal signal comprises sensing the magnetic field along the fourth axis by a fourth plurality of magnetoresistance elements of the second bridge structure. The fourth plurality of magnetoresistance elements can be positioned orthogonally with respect to the third plurality of magnetoresistance elements. In some embodiments, each of the first, second, third, and fourth pluralities of magnetoresistance elements include a reference layer and a free layer, and a pinning of the reference layer can range from about 1 kOe to about 3 kOe (e.g., about 1.2 kOe to about 2.5 kOe).

In another aspect, a magnetic field angle sensor to detect a direction of a magnetic field includes a first means for generating a first sinusoidal signal indicative of the magnetic field along a first axis and a first cosinusoidal signal indicative of the magnetic field along a second axis that is orthogonal with respect to the first axis, and a second means for generating a second sinusoidal signal indicative of the magnetic field along a third axis and a second cosinusoidal signal indicative of the magnetic field along a fourth axis that is orthogonal with respect to the third axis. An angle between the first axis and the third axis can be a factor of 90°.

The angle between the first axis and the third axis can be approximately 45°.

The magnetic field angle sensor can further include means for supporting the first and second generating means. The magnetic field angle sensor can include means for computing the direction of the magnetic field in response to the first sinusoidal signal, the first cosinusoidal signal, the second sinusoidal signal, and the second cosinusoidal signal. The computing means can include means for determining a first arctangent of the first sinusoidal signal and the first cosinusoidal signal and a second arctangent of the second sinusoidal signal and the second cosinusoidal signal.

The computing means can include a means for subtracting the angle between the first axis and the third axis from the second arctangent to generate a third arctangent. In some embodiments, the computing means includes means for calculating a mean value of the first arctangent and the third arctangent in order to provide an output signal indicative of the direction of the magnetic field.

The magnetic field angle sensor can include third means for generating a third sinusoidal signal indicative of the magnetic field along a fifth axis and a third cosinusoidal signal indicative of the magnetic field along a sixth axis that is orthogonal with respect to the fifth axis, and fourth means for generating a fourth sinusoidal signal indicative of the magnetic field along a seventh axis and a fourth cosinusoidal signal indicative of the magnetic field along an eighth axis that is orthogonal with respect to the seventh axis. The angle between the first axis and the third axis can provide a first angle, a second angle between the fifth axis and the first axis is a factor of 90°, a third angle between the seventh axis and the first axis is a factor of 90°. In an embodiment, the first angle, the second angle and the third angle can be different angles.

The first angle can be approximately 45°, the second angle can be approximately 22.5°, and the third angle can be approximately 67.5°.

The first generating means can include a first bridge structure comprising a first plurality of magnetoresistance elements to sense the magnetic field along the first axis and a second plurality of magnetoresistance element to sense the magnetic field along the second axis, and the second generating means can include a second bridge structure comprising a third plurality of magnetoresistance elements to sense the magnetic field along the third axis and a fourth plurality of magnetoresistance elements to sense the magnetic field along the fourth axis.

In an embodiment, each of the first, second, third, and fourth pluralities of magnetic field sensing elements can include one or more of giant magnetoresistance (GMR) elements, anisotropic magnetoresistance (AMR) elements, tunneling magnetoresistance (TMR) elements or magnetic tunnel junction (MTJ) elements. Each of the first, second, third and fourth pluralities of magnetoresistance elements comprise a reference layer and a free layer. A pinning of the reference layer can range from about 1 kOe to about 2 kOe (e.g., about 1.2 kOe to about 2.5 kOe).

The details of one or more embodiments of the disclosure are set forth in the accompanying drawings and the description below. Other features, objects, and advantages of the disclosure will be apparent from the description and drawings, and from the claims.

BRIEF DESCRIPTION OF THE DRAWINGS

The foregoing features may be more fully understood from the following description of the drawings in which like reference numerals indicate like elements.

DETAILED DESCRIPTION

Before describing the present invention, some introductory concepts and terminology are explained.

As is known, there are different types of magnetoresistance elements, for example, a giant magnetoresistance (GMR) element, an anisotropic magnetoresistance element (AMR), and a tunneling magnetoresistance (TMR) element, also called a magnetic tunnel junction (MTJ) element.

Of these magnetoresistance elements, the GMR and the TMR elements operate with spin electronics (i.e., electron spins) where the resistance is related to the magnetic orientation of different magnetic layers separated by nonmagnetic layers. In spin valve configurations, the resistance is related to an angular direction of a magnetization in a so-called "free-layer" respective to another layer so-called "reference layer." The free layer and the reference layer are described more fully below.

The magnetoresistance element may be a single element or, alternatively, may include two or more magnetoresistance elements arranged in various configurations, e.g., a half bridge or full (Wheatstone) bridge.

As used herein, the term "magnetic field angle sensor" is used to describe a circuit that uses a magnetic field sensing element, generally in combination with other circuits. In a typical magnetic field sensor, the magnetic field sensing element and the other circuits can be integrated upon a common substrate.

Figure 1:
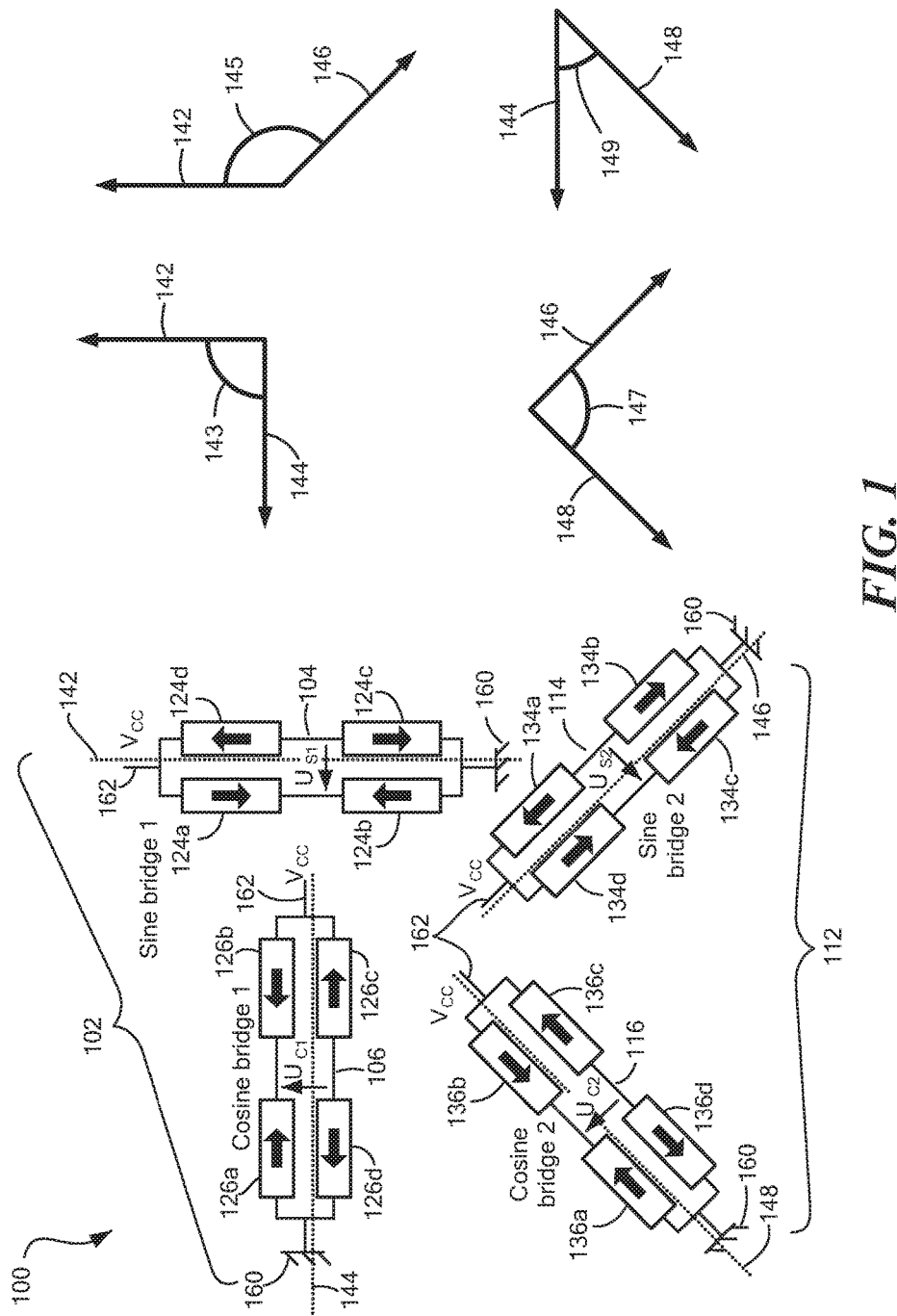
FIG. 1 shows a diagram of two bridge structures of an angle sensor, with each bridge structure having a sine bridge and a cosine bridge.

Now referring to FIG. 1, an angle sensor 100 is illustrated having a first bridge structure 102 and a second bridge structure 112. First bridge structure 102 includes a first sine bridge 104 and a first cosine bridge 106, and second bridge structure 112 includes a second sine bridge 114 and a second cosine bridge 116. Angle sensor 100 can be configured to detect a direction of a magnetic field based in part on signals generated from each of first sine bridge 104, first cosine bridge 106, second sine bridge 114, and second cosine bridge 116.

For example, first and second bridge structures 102, 112 can be formed as gradiometers and be configured to detect different properties of the magnetic field. First sine bridge 104 of first bridge structure 102 and second sine bridge 114 of second bridge structure 112 can measure the sine of the magnetic field. First cosine bridge 106 of first bridge structure 102 and second cosine bridge 116 of second bridge structure 112 can measure the cosine of the magnetic field. Thus, each of first and second bridge structures 102, 112 can measure sine and cosine properties of the magnetic field.

More particularly, each of first sine bridge 104, first cosine bridge 106, second sine bridge 114, and second cosine bridge 116 can measure projections and/or properties of the magnetic field along respective axes. For example, and as illustrated in FIG. 1, first sine bridge 104 is disposed along a first axis 142 and first cosine bridge 106 is disposed along a second axis 144. In an embodiment, an angle 143 between first axis 142 and second axis 144 may be approximately 90°. Also, as illustrated in FIG. 1, second sine bridge 114 is disposed along a third axis 146 and second cosine bridge 116 is disposed along a fourth axis 148. In an embodiment, an angle 147 between third axis 146 and fourth axis 148 may be approximately 90°.

The third and fourth axes 146, 148 of the second bridge structure 112 can be tilted at an angle (i.e., tilt angle) with respect to the first and second axes 142, 144 of the first bridge structure 102, that is a factor of 90°. For example, a tilt angle 145 between first axis 142 and third axis 146 can be approximately 45° and a tilt angle 149 between second axis 144 and fourth axis 148 can be approximately 45°. It should be appreciated that the tilt angles 145, 149 between axes of different bridge structures can vary based at least in part on the number of bridge structures of a particular angle sensor. For example, in some embodiments, the tilt angle between axes of different bridge structures can include any angle between about −90° to about 90°.

Each of first and second bridge structures 102, 112 includes a plurality of magnetoresistance elements. For example, and as illustrated in FIG. 1, the first sine bridge 104 includes a plurality of magnetoresistance elements 124a-124d, the first cosine bridge 106 includes a plurality of magnetoresistance elements 126a-126d, the second sine bridge 114 includes a plurality of magnetoresistance elements 134a-134d, and the second cosine bridge 116 includes a plurality of magnetoresistance elements 136a-136d. It should be appreciated that although FIG. 1 illustrates of each bridge structure having four magnetoresistance elements, the bridge structures described herein may include more or less magnetoresistance elements based at least in part on a particular application of angle sensor 100.

Each first sine bridge 104, first cosine bridge 106, second sine bridge 114, and second cosine bridge 116 can have a first terminal coupled to a voltage supply terminal (e.g., Vcc) 162 and a second terminal coupled to a ground terminal 160. In other embodiments, each first sine bridge 104, first cosine bridge 106, second sine bridge 114, and second cosine bridge 116 can have the first terminal coupled to a current supply terminal (e.g., Icc) and the second terminal coupled to a ground terminal 160.

Figure 1A:
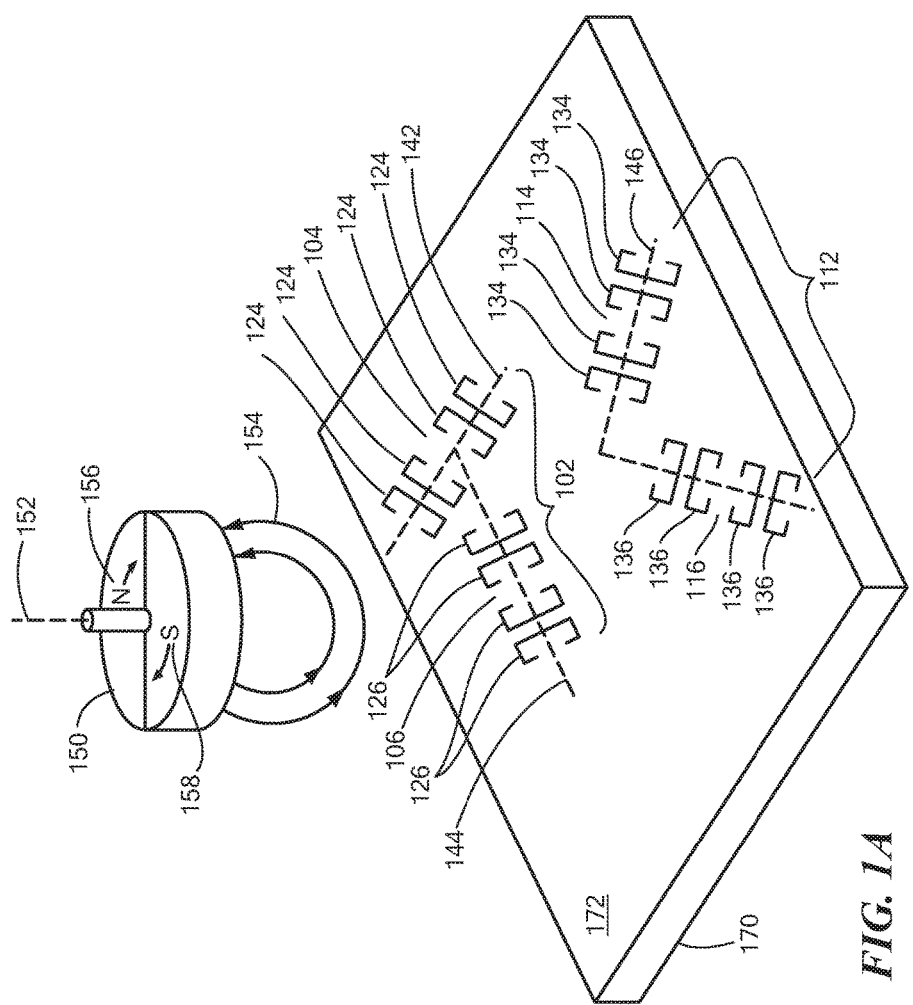
FIG. 1A shows the two bridge structures of FIG. 1 disposed on a substrate and relative to a magnet.

Now referring to FIG. 1A, angle sensor 100 includes first and second bridge structures 102, 112 disposed on a first surface 172 of a substrate 170. Angle sensor 100 can be configured to detect a direction of a magnetic field 154 generated by magnet 150 as it rotates about an axis 152. Magnet 150 can include a north pole 156 and a south pole 158 and magnetic field 154 (e.g., magnetic field flux lines) can run between north pole 156 and south pole 158.

Angle sensor 100 can measure projections of magnetic field 154 along each of a plurality of different axes 142, 144, 146, 148. For example, first sine bridge 104 can measure components of magnetic field 154 along first axis 142 and generate a first sinusoidal signal indicative of magnetic field 154 along first axis 142. First cosine bridge 106 can measure components of magnetic field 154 along second axis 144 and generate a first cosinusoidal signal indicative of magnetic field 154 along the second axis 144. Second sine bridge 114 can measure components of magnetic field 154 along third axis 146 and generate a second sinusoidal signal indicative of magnetic field 154 along the third axis 146. Second cosine bridge 116 can measure components of magnetic field 154 along fourth axis 148 and generate a second cosinusoidal signal indicative of magnetic field 154 along the fourth axis 148. As will be described in greater detail below with respect to FIGS. 4-5, the outputs of first sine bridge 104, first cosine bridge 106, second sine bridge 114, and second cosine bridge 116 can be averaged or otherwise compared to determine the direction of magnetic field 154.

Each of first bridge structure 102 and second bridge structure 112 can measure components of magnetic field 154 along at least two axes as sine bridge 104, first cosine bridge 106, second sine bridge 114, and second cosine bridge 116 are positioned relative to different axes 142, 144, 146, 148 respectively. First bridge structure 102 and second bridge structure 112 can measure components of magnetic field 154 at different angles such that an angle error percentage of the output signal generated by angle sensor 100 can be reduced by a factor corresponding to the number of bridge structures.

For example, the angle error of a signal produced by first bridge structure 102 and second bridge structure 112 can be periodic. However, and as illustrated in FIGS. 1-1A, axes of second bridge structure 112 can be tilted at tilt angles with respect to axes of first bridge structure 102 such that the respective angle error associated with signals from each bridge structure is opposite with respect to each other. The outputs of first bridge structure 102 and second bridge structure 112 can be averaged or a mean value between the two outputs can be taken having a reduced error angle based on part on the number of bridge structures, here two in angle sensor 100. In an embodiment, the tilt angle 145 between first axis 142 and third axis 146 and the tilt angle 149 between second axis 144 and fourth axis 148 can be selected to reduce an angle error of angle sensor 100.

Figure 1B:
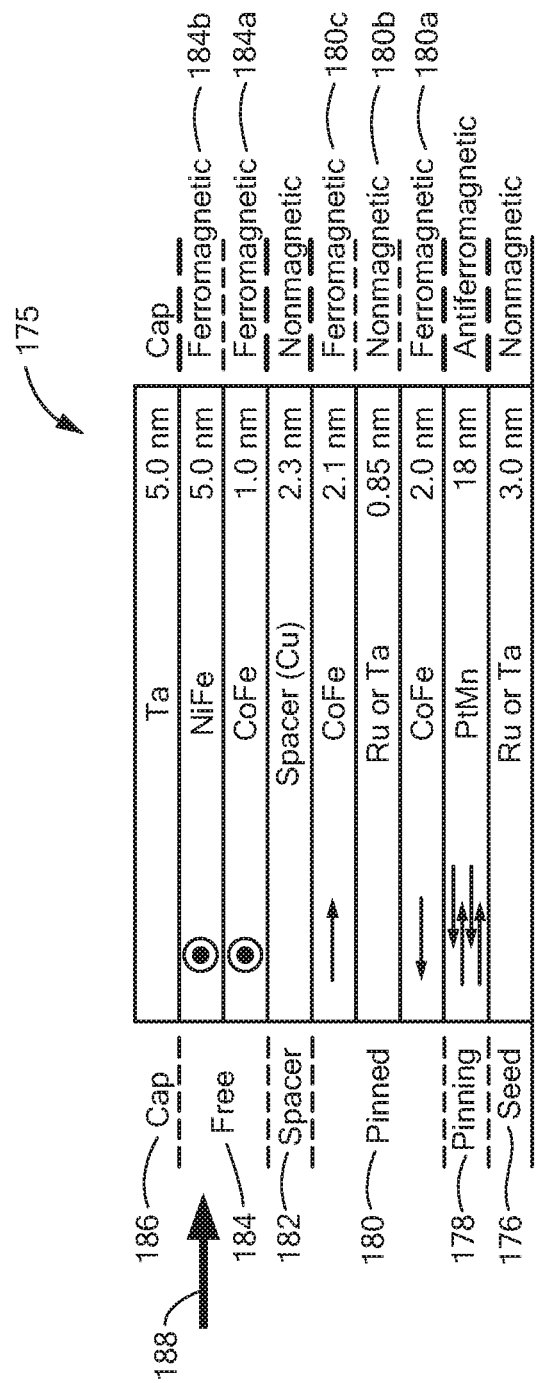
FIG. 1B illustrates layers of a GMR element with a single pinned arrangement.

Now referring to FIG. 1B, a magnetic field sensing element 175 (e.g., MR element, GMR element) includes a plurality of layers disposed over a substrate. Magnetic field sensing element 175 may be the same as or substantially similar to the magnetoresistance elements described above with respect to FIGS. 1-1A and described below with respect to FIG. 2.

An upper surface of the substrate is shown as a lowermost line at the bottom of FIG. 1B. In an embodiment, a pinning strength or pinning factor of a reference layer of magnetic field sensing element 175 can be modified to reduce an angle error of an angle sensor including the magnetic field sensing element 175. For example, as the pinning factor of a layer of the one or more magnetoresistance elements of a particular bridge structure increases, the angle error of the bridge structure decreases.

In some embodiments, each bridge structure described here can include a plurality of magnetoresistance elements. Each of the magnetoresistance elements can include a reference layer and a free layer. A pinning (or pinning factor) of the reference layer can range from about 1 kOe to about 3 kOe. In some embodiments, a pinning (or pinning factor) of the reference layer can range from about 1.2 kOe to about 2.5 kOe. It should be appreciated however that the pinning (or pinning factor) of the reference layer can vary based at least in part on an application of the angle sensor. For example, in some embodiments, the pinning (or pinning factor) of the reference layer can be less than 1 kOe or greater than 3 kOe.

In an embodiment, a reference layer may refer to ferromagnetic layer, such as but not limited to ferromagnetic layer 180c. It should be appreciated that the reference layer can refer to the layer from the pinned layers 180 that is interfacing with a spacer layer (here spacer (CU) layer 182) as this layer can modify sensitivity properties (e.g., sensitivity axis) of the magnetic field sensing element 175. The free layer and the reference layer are described more fully below.

On the left side of FIG. 1B, each layer is identified by functional name. On the right side or FIG. 1B are shown magnetic characteristics of sub-layers that can form the functional layers. In general, magnetic materials can have a variety of magnetic characteristics and can be classified by a variety of terms, including, but not limited to, ferromagnetic, antiferromagnetic, and nonmagnetic. Description of the variety of types of magnetic materials is not made herein in detail.

As shown, the magnetic field sensing element 175 can include a seed layer 176 disposed over the substrate, an antiferromagnetic pinning layer 178 disposed over the seed layer 176, and a pinned layer 180 disposed over the antiferromagnetic pinning layer 176. The pinned layer 180 can be comprised of a first ferromagnetic pinned layer 180a, a second ferromagnetic pinned layer 180c, and a spacer layer 180b disposed there between.

The magnetic field sensing element 175 can also include a spacer layer 182 disposed over the second ferromagnetic pinned layer 180c, and a free layer 184 disposed over the spacer layer 182. The spacer layer 180b is a nonmagnetic metallic layer. The spacer 182 is also a nonmagnetic layer, which can be metallic for GMR or insulating for TMR. The free layer 184 can be comprised of a first ferromagnetic free layer 184a and a second ferromagnetic free layer 184b.

A cap layer 186 can be disposed over the free layer 184 to protect the magnetic field sensing element 175.

Examples of thicknesses of the layers of the magnetic field sensing element 175 are shown in nanometers. Examples of materials of the layers of the conventional prior art GMR element are shown by atomic symbols.

Within some layers, arrows are shown that are indicative or directions of magnetic field directions of the layers when the magnetic field sensing element 175 does not experience an external magnetic field. Arrows coming out of the page are indicated as dots within circles and arrows going into the page are indicated as crosses within circles.

Taking the layers from the bottom upward, the seed layer 176 is used to provide a regular crystalline structure upon the substrate that affects crystal properties of layers above.

With regard to the antiferromagnetic pinning layer 178, sub-layers (i.e., layer portions) within the antiferromagnetic pinning layer 178 tend to have magnetic fields that point in alternating different directions indicated by right and left arrows, resulting in the antiferromagnetic pinning layer having a net magnetic field of zero. A top surface of the antiferromagnetic pinning layer 178 tends to have a magnetic moment pointing in one direction, here shown to the left.

In an embodiment, by increasing a pinning factor of ferromagnetic pinned layer 180c, an angle error percentage of an angle sensor can be reduced. For example, to modify the pinning factor of a layer of magnetic field sensing element 175, the shape, thickness or other forms of dimensions can be altered to increase the pinning factor of a layer of magnetic field sensing element 175.

The pinning factor can be modified (or generated) by at least two different techniques. In some embodiments, the pinning factor can be modified (or generated) using synthetic antiferromagnet (SAF), as will be described in greater detail below.

In other embodiments, the pinning factor can be modified (or generated) by modifying the pinning between first ferromagnetic pinned layer 180a and antiferromagnetic pinning layer 178. For example, to increase the pinning factor, the coupling between first ferromagnetic pinned layer 180a and second ferromagnetic pinned layer 180c can be strengthened by reducing the thickness of the spacer 180b or by changing the material of the spacer 180b (e.g. Rh instead of Ru). In some embodiments, the surface of the substrate that magnetic field sensing element 175 is disposed upon can be smoothed out or a roughness of the surface of the substrate can be reduced such that additional coupling can counteract the coupling through the spacer 180b. The thickness and magnetization of the first ferromagnetic pinned layer 180a and second ferromagnetic pinned layer 180c can be balanced to balance the SAF so that the magnetic field (e.g., magnetic field flux lines) emitted by first ferromagnetic pinned layer 180a can be compensated by second ferromagnetic pinned layer 180c. In some embodiments, the thickness of antiferromagnetic pinning layer 178 can be increased to strengthen the anisotropy of the antiferromagnetic pinning layer 178.

With regard to the pinned layer 180, the first ferromagnetic pinned layer 180a tends to couple to the top surface of the antiferromagnetic pinning layer 178, and thus, the magnetic field in the first ferromagnetic pinned layer 180a can by aligned in parallel to the magnetic moments at the top surface of the antiferromagnetic pinning layer 178, here shown to the left.

Due to the presence of the spacer layer 180b between the first and second ferromagnetic pinned layers 180a, 180c the second ferromagnetic pinned layer 180c tends to couple antiferromagnetically with the first ferromagnetic pinned layer 180a, and thus, it has a magnetic field pointing in the other direction, here shown pointing to the right. The combination of the three layers 180a, 180b, 180c can be referred to as a synthetic antiferromagnetic structure or layer.

The first and second free layers 184a, 184b have respective magnetic fields pointing out of the page in the absence of an external magnetic field. This pointing direction can be achieved by creating a specific anisotropy along a direction pointing out of the page. That anisotropy can be created by a shape of the respective magnetic field sensing element (e.g., GMR element). For example, the anisotropy can be created by patterning the magnetic field sensing element 175 (top view) to have a yoke shape, or by a crystalline or a magnetic anisotropy. By created the yoke shape, the free layer 184 has a preferential axis (the yoke axis). If the yoke axis is perpendicular to the reference magnetization a crossed anisotropy can be achieved, which allows obtaining a linear response on a field extension of the order of the free layer anisotropy.

In operation, when the magnetic field sensing element 175 is exposed to an external magnetic field pointing in a direction of an arrow 188, the magnetic fields in the ferromagnetic free layers 184a, 184b tend to rotate to the right to become more aligned (or fully aligned, i.e., pointing to the right) with the magnetic field pointing direction in the second ferromagnetic pinned layer 180c. In an embodiment, a coupling between first ferromagnetic pinned layer 180a and second ferromagnetic pinned layer 180c through spacer layer 180b can be referred to as Ruderman-Kittel-Kasuya-Yosida (RKKY) coupling. The pinned layers 180a, 180c can act as a single unit insensitive to external field. Thus, the pinning layer 178 can be configured to fix the direction and axis of sensitivity of the pinned layers 180a, 180c. For example, the magnetizations in the pinned layer 180 are pinned by the antiferromagnetic pinning layer and do not rotate. The amount of rotation of the magnetic fields in the ferromagnetic free layers 184a, 184b depends upon the magnitude of the external magnetic field. The increased alignment of the magnetic fields in the ferromagnetic free layers 184a, 184b with the direction of the magnetic field in the second ferromagnetic pinned layer 180c tends to make a resistance of the magnetic field sensing element 175 lower.

Conversely, when the GMR element is exposed to an external field pointing opposite to the direction of the arrow 188, the magnetic fields in the free layer 184 tend to rotate to the left to become more anti-aligned (or fully anti-aligned, i.e., pointing to the left) with the magnetic field pointing direction in the second ferromagnetic pinned layer 180c. The amount of rotation depends upon the magnitude of the external magnetic field. The increased anti-alignment of the magnetic fields in the ferromagnetic free layers 184a, 184b with the direction of the magnetic field in the second ferromagnetic pinned layer 180c tends to make a resistance of the magnetic field sensing element 175 higher.

Figure 2:
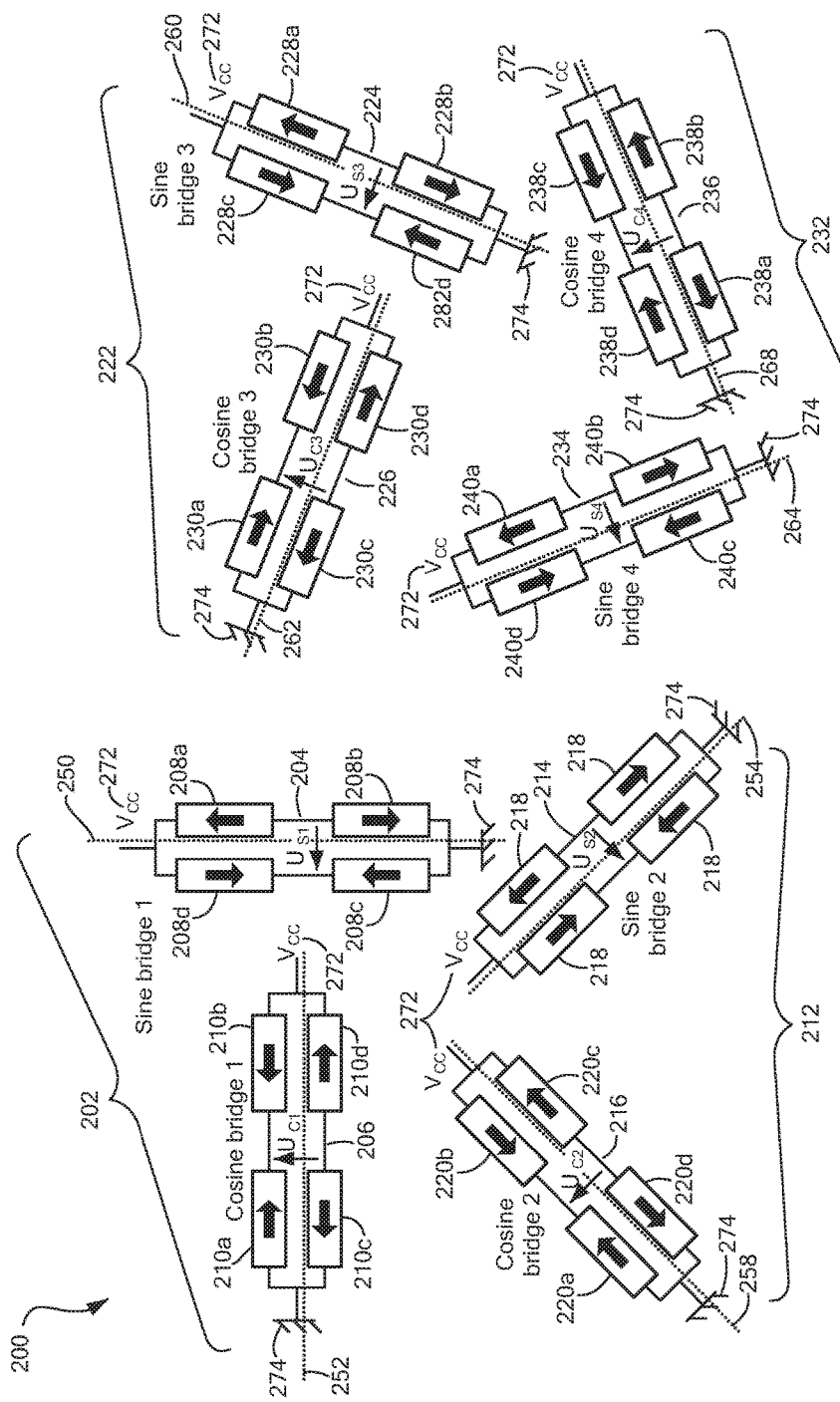
FIG. 2 shows a diagram of an angle sensor having four bridge structures with each bridge structure having a sine bridge and a cosine bridge.
Figure 2A:
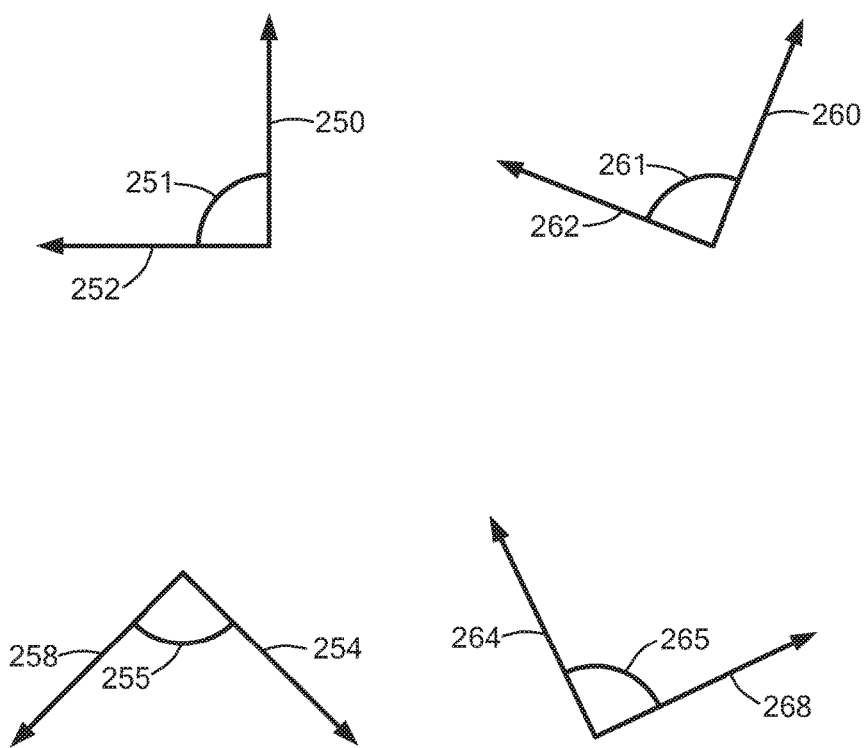
FIG. 2A shows a diagram of different angles between axes of common bridge structures.
Figure 2B:
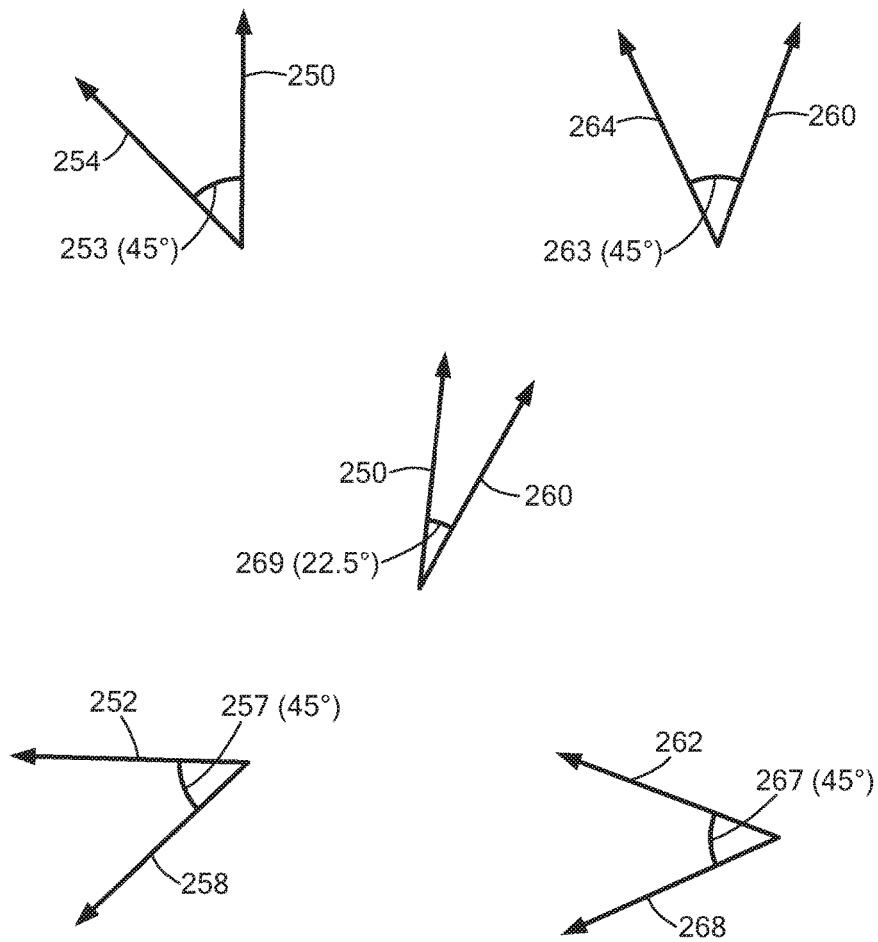
FIG. 2B shows a diagram of different tilt angles between axes of different bridge structures.

Now referring to FIGS. 2-2B, an angle sensor 200 includes a first, second, third and fourth bridge structures 202, 212, 222, 232, respectively. Angle sensor 200 may be similar to angle sensor 100, however angle sensor 200 includes four bridge structures.

First bridge structure 202 includes a first sine bridge 204 and a first cosine bridge 206, and second bridge structure 212 includes a second sine bridge 214 and a second cosine bridge 216. Third bridge structure 222 includes a third sine bridge 224 and a third cosine bridge 226, and fourth bridge structure 232 includes a fourth sine bridge 234 and a fourth cosine bridge 236. Angle sensor 200 can be configured to detect a direction of a magnetic field based in part on signals generated from each of first sine bridge 204, first cosine bridge 206, second sine bridge 214, second cosine bridge 216, third sine bridge 224, third cosine bridge 226, fourth sine bridge 234, and fourth cosine bridge 236.

For example, each of first, second, third and fourth bridge structures 202, 212, 222, 232 can measure the sine and cosine of magnetic field components with respect to different axes. First sine bridge 204, of first bridge structure 202, second sine bridge 214 of second bridge structure 112, third sine bridge 224 of third bridge structure 222, and fourth sine bridge 234 of fourth bridge structure 232 can measure the sine of the magnetic field. First cosine bridge 206 of first bridge structure 202 and second cosine bridge 216 of second bridge structure 212, third cosine bridge 226 of third bridge structure 222 and fourth cosine bridge 236 of fourth bridge structure 232 can measure the cosine of the magnetic field.

The sine and cosine bridges of each of first, second, third and fourth bridge structures 202, 212, 222, 232 can measure projections and/or properties of the magnetic field along different axes. For example, and as illustrated in FIG. 2, first sine bridge 204 is disposed along a first axis 250 and first cosine bridge 206 is disposed along a second axis 252. In an embodiment, and an angle 251 between first axis 250 and second axis 252 may be approximately 90° (FIG. 2A). Second sine bridge 214 is disposed along a third axis 254 and second cosine bridge 216 is disposed along a fourth axis 258. In an embodiment, an angle 255 between third axis 254 and fourth axis 258 may be approximately 90° (FIG. 2A).

Also, as illustrated in FIG. 2, third sine bridge 224 is disposed along a fifth axis 260 and third cosine bridge 226 is disposed along a sixth axis 262. In an embodiment, an angle 261 between fifth axis 260 and sixth axis 262 may be approximately 90° (FIG. 2A). Fourth sine bridge 234 is disposed along a seventh axis 264 and fourth cosine bridge 236 is disposed along an eighth axis 268. In an embodiment, an angle 265 between seventh axis 264 and eighth axis 266 may be approximately 90° (FIG. 2A).

The different bridge structures can be titled at various tilt angles with respect to each other. For example, and as illustrated in FIG. 2B considering the sine bridge of each bridge structure, third axis 254 can be disposed at a first tilt angle 253 with respect to first axis 250. Fourth axis 258 can be disposed at a second tilt angle 257 with respect to second axis 252. Seventh axis 264 can be disposed at a third tilt angle 263 with respect to fifth axis 260. Eighth axis 268 can be disposed at a fourth tilt angle 267 with respect to sixth axis 262. In an embodiment, first, second, third and fourth tilt angles 253, 257, 263, 267 may be different. In some embodiments, one or more of first, second, third and fourth tilt angles 253, 257, 263, 267 may be the same. In some embodiments, the fifth axis 260 can be disposed a fifth tilt angle 269 with respect to first axis 250. It should be appreciated that the tilt angle between axes of different bridge structures can include any angle between about −90° to about 90°.

The first, second, third and fourth tilt angles 253, 257, 263, 267 can be factors of approximately 90° and/or factors of approximately 45°. In some embodiments, the first, second, third and fourth tilt angles 253, 257, 263, 267 can be selected such that an error percentage of first, second, third, and fourth bridge structures 202, 212, 222, 232 are opposite.

The first, second, third and fourth tilt angles 253, 257, 263, 267 can be selected such that each of the different axes first, second, third and fourth bridge structures 202, 212, 222, 232 are evenly spaced. For example, the different axes of second, third and fourth bridge structures 212, 222, 232 can tilted with respect to first bridge structure 202. The different tilt angles can be factor or multiples of each other. In such an embodiment, a first tilt angle between axes of second bridge structure 212 and first bridge structure 202 can be approximately 45°, a second tilt angle between axes of third bridge structure 222 and first bridge structure 202 can be approximately 22.5° and a third tilt angle between axes of fourth bridge structure 232 and first bridge structure 202 can be approximately 67.5°.

It should be appreciated that the tilt angle between axes of different bridge structures can be selected based at least on a particular application of the angle sensor. In some embodiments, the tilt angle between axes of different bridge structures can be selected using an iterative method. For example, a first bridge structure can be generated having a cosine bridge and a sine bridge disposed at approximately 90° with respect to each other. Then each subsequent bridge structure can include a cosine bridge and a sine bridge disposed at approximately 90° and each subsequent bridge structure can be tilted at a tilt angle with respect to the first bridge structure or any other bridge structure in the respective angle sensor. Thus, the cosine bridges of each subsequent bridge structure can be titled with respect to the cosine bridge of the first bridge structure and sine bridges of each subsequent bridge structure can be titled with respect to the sine bridge of the first bridge structure. In some embodiments, an angle sensor can include one or more groups of bridge structures with each group of bridge structures having two or more bridge structures.

Each of first, second, third and fourth bridge structures 202, 212, 222, 232 include a plurality of magnetoresistance elements. For example, and as illustrated in FIG. 2, the first sine bridge 204 includes a plurality of magnetoresistance elements 208a-208d, the first cosine bridge 206 includes a plurality of magnetoresistance elements 210a-210d, the second sine bridge 214 includes a plurality of magnetoresistance elements 218a-218d, and the second cosine bridge 216 includes a plurality of magnetoresistance elements 220a-220d. The third sine bridge 224 includes a plurality of magnetoresistance elements 228a-228d, the third cosine bridge 226 includes a plurality of magnetoresistance elements 230a-230d, the fourth sine bridge 234 includes a plurality of magnetoresistance elements 240a-240d, and the fourth cosine bridge 236 includes a plurality of magnetoresistance elements 238a-238d.

A first terminal of first sine bridge 204, first cosine bridge 206, second sine bridge 214, second cosine bridge 216, third sine bridge 224, third cosine bridge 226, fourth sine bridge 234, and fourth cosine bridge 236 can be coupled to a voltage supply terminal (e.g., Vcc) 272. A second terminal of first sine bridge 204, first cosine bridge 206, second sine bridge 214, second cosine bridge 216, third sine bridge 224, third cosine bridge 226, fourth sine bridge 234, and fourth cosine bridge 236 can be coupled to a ground terminal 274.

Figure 3:
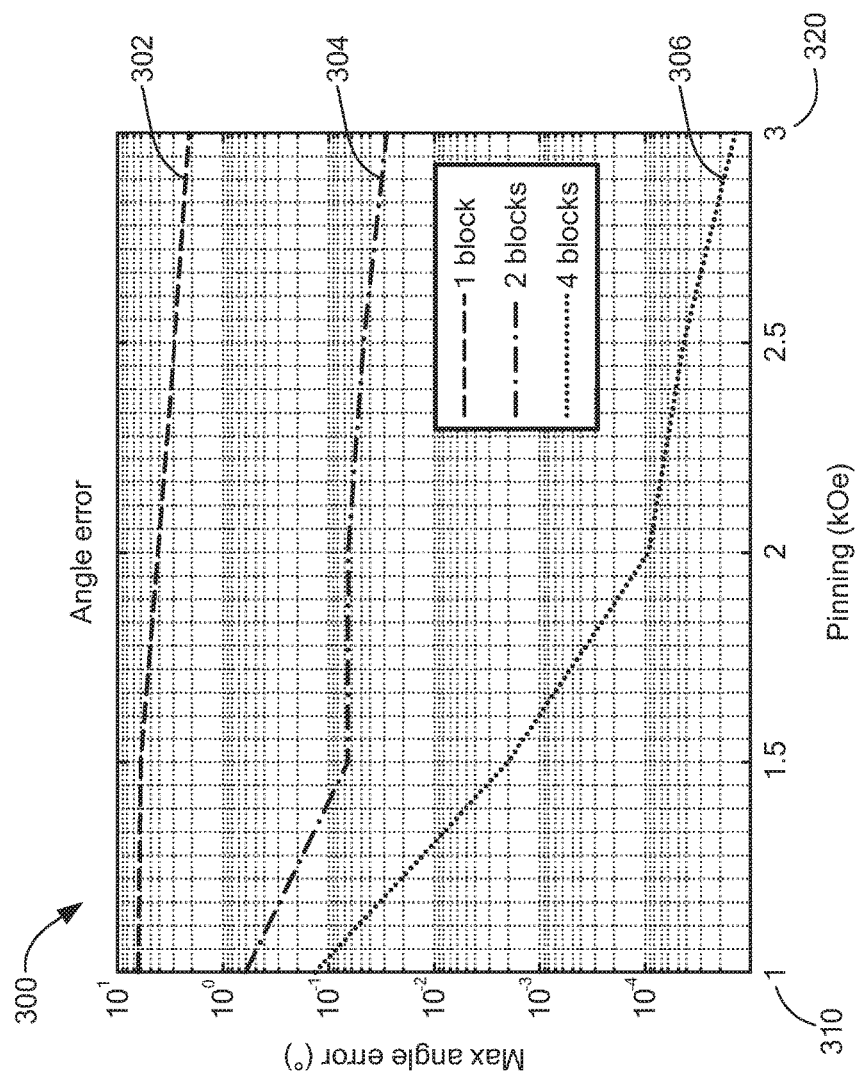
FIG. 3 is a plot showing angle error as a function of pinning strength for angle sensors having different numbers of bridge structures.

Now referring to FIG. 3, a plot 300 illustrates changes in angle error (e.g., absolute angle error) for an angle sensor as a pinning factor of a reference layer of the angle sensors changes for three different angle sensors 302, 304, 306, with the angle error values provided along the vertical axis (e.g., y-axis) and the pinning factor provided along the horizontal axis (e.g., x-axis) in kilo Oersted units (kOe). In particular, line 302 illustrates the angle error for an angle sensor having one bridge structure, line 304 illustrates the angle error for an angle sensor having two bridge structures (e.g., angle sensor 100 of FIG. 1) and line 306 illustrates the angle error for an angle sensor having four bridge structures (e.g., angle sensor 200 of FIG. 2).

As illustrated in FIG. 3, as the pinning factor increases, the absolute angle error decreases. Further, as the number of bridge structures within an angle sensor increases, the absolute angle error decreases. For example, line 302 corresponds to an angle sensor having one bridge structure. For line 302, as the pining factor increases from a first pinning factor value 310, here 1 kOe to a second pinning factor value 320, here 3 kOe, the angle error percentage decreases.

However, by increasing the number of bridge structures within the angle sensor, a greater decrease in absolute angle error for an angle sensor can be achieved. For example, line 304 corresponds to an angle sensor having two bridge structures. For line 304, at the first pinning factor value 310, here 1 kOe, the angle sensor having two bridge structures has a lower absolute angle as compared the angle sensor having one bridge structure represented by line 302. Further, as the pinning factor increases from the first pinning factor value 310, here 1 kOe to the second pinning factor value 320, here 3 kOe, line 304 (i.e., angle sensor having two bridge structures) experiences a greater decrease in the angle error as compared to the angle sensor having one bridge structure represented by line 302 (e.g., greater rate of change of line 304 as compared to line 302).

Line 306 corresponds to an angle sensor having four bridge structures and at the first pinning factor value 310, here 1 kOe, the angle sensor having four bridge structures has a lower absolute angle error as compared the angle sensor having two bridge structures (line 304) and/or the angle sensor having one bridge structure (line 302). Further, as the pinning factor increases from the first pinning factor value 310, here 1 kOe to the second pinning factor value 320, here 3 kOe, line 306 (i.e., angle sensor having four bridge structures) experiences a greater decrease in the angle error as compared to the angle sensor having two bridge structures represented by line 304 and/or the angle sensor having one bridge structure represented by line 302 (e.g., greater rate of change of line 306 as compared to lines 304 and 302). Therefore, by increasing a pinning factor of an angle sensor, increasing the number of bridge structures within an angle sensor or a combination of both, the angle error percentage for an angle sensor can be reduced.

Figure 4:
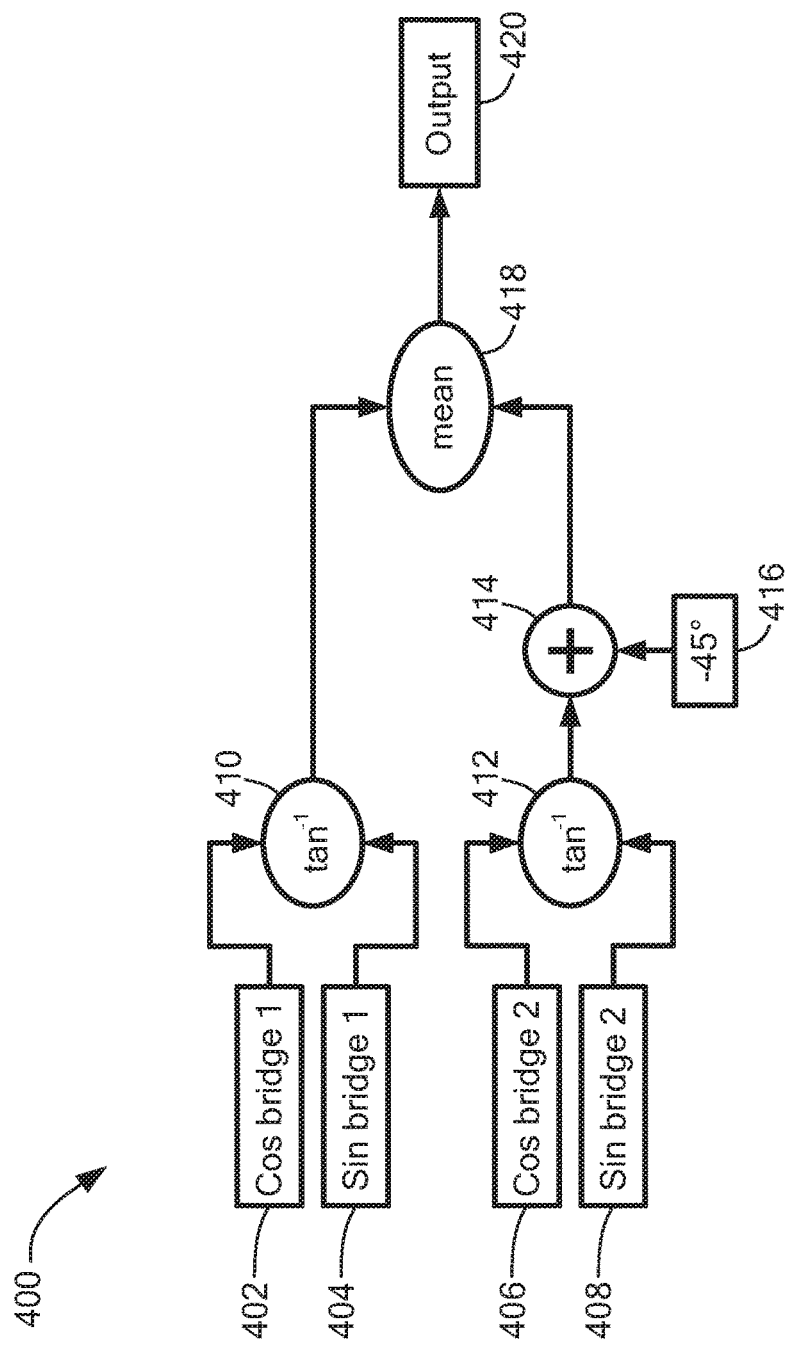
FIG. 4 is a block diagram illustrating angle sensor having two bridge structures.

Now referring to FIG. 4, a block diagram 400 includes a first cosine bridge module 402, a first sine bridge module 404, a second cosine bridge module 406 and a second sine bridge module 408. In an embodiment, first cosine bridge module 402, first sine bridge module 404, second cosine bridge module 406 and second sine bridge module 408 can correspond to the outputs of first cosine bridge 106, first sine bridge 104, second cosine bridge 114 and second sine bridge 114 of FIG. 1, respectively.

Circuit 400 can be coupled to or a component of angle sensor 100 of FIG. 1 and can be configured to process output signals (sinusoidal and cosinusoidal signals) generated by first and second bridge structures 102, 112 to generate an output signal indicative of a direction of magnetic field measured by first and second bridge structures 102, 112.

An output of first cosine bridge module 402 is coupled to a first input of a first arctangent module 410 and an output of first sine bridge module 404 is coupled to a second input of the first arctangent module 410. In an embodiment, the output of the first cosine bridge module 402 can be a first cosinusoidal signal and the output of first sine bridge module 404 can be a first sinusoidal signal. First arctangent module 410 can compute a first arctangent value based on the first sinusoidal signal and the first cosinusoidal signal.

An output of first arctangent module 410 is coupled to a first input of a summing module 418 to provide the first arctangent value.

An output of second cosine bridge module 406 is coupled to a first input of a second arctangent module 412 and an output of second sine bridge module 408 is coupled to a second input of the second arctangent module 412. In an embodiment, the output of the second cosine bridge module 404 can be a second cosinusoidal signal and the output of second sine bridge module 404 can be a second sinusoidal signal. Second arctangent module 412 can be compute a second arctangent value based on the second sinusoidal signal and the second cosinusoidal signal.

An output of second arctangent module 412 is coupled to a first input of a differencing element 414 to provide the second arctangent value. A second input of differencing element 414 is coupled to receive a tilt angle 416. The tilt angle 416 can be a positive or negative angle value.

The tilt angle 416 may correspond to an angle difference between a bridge or axis of a first bridge structure and a bridge or axis of a second bridge structure (or any other bridge structure in the respective angle sensor). For example, in an embodiment, the tilt angle 416 may correspond to the tilt angles 145, 149 that third and fourth axes 146, 148 of the second bridge structure 112 of FIG. 1 are tilted at with respect to the first and second axes 142, 144 of the first bridge structure 102 of FIG. 1, respectively. Stated differently, the tilt angle 416 can correspond to the first tilt angle 145 between first axis 142 and third axis 146 of FIG. 1 and/or a second tilt angle 149 between second axis 144 and fourth axis 148 of FIG. 1.

The differencing element 414 can apply the tilt angle value 416 to the second arctangent value to generate a differencing value (e.g., third arctangent value). In some embodiments, the differencing element 414 can subtract the tilt angle 416 from the second arctangent value to generate the differencing value. In other embodiments, the differencing element 414 can add a negative tilt angle 416 to the second arctangent value to generate the differencing value.

An output of the differencing element 414 can be coupled to a second input of the summing module 418. The summing module 418 can receive the first arctangent value and the differencing value (e.g., third arctangent value) and compute a mean value of the first arctangent value and the differencing value. The output of summing module 418 is an output signal 420 that is the determined mean value. In an embodiment, output signal 420 can be indicative of the direction of the magnetic field.

Figure 5:
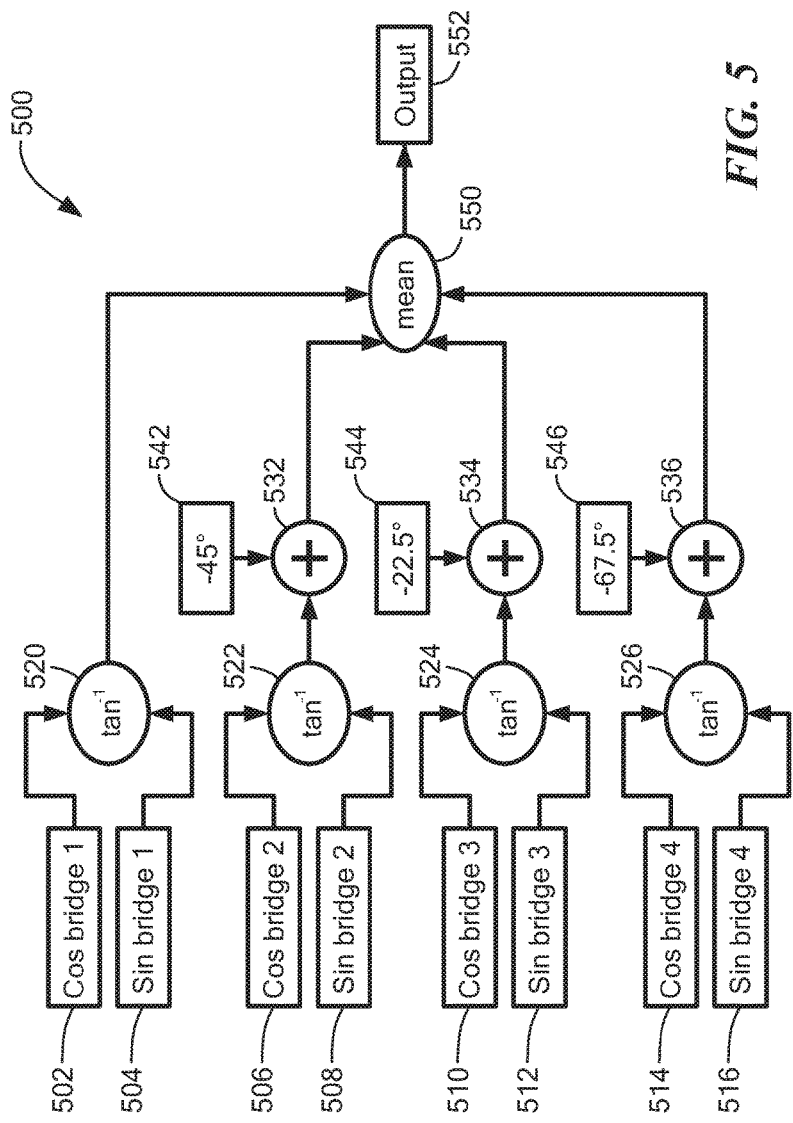
FIG. 5 is a block diagram illustrating angle sensor having four bridge structures.

Now referring to FIG. 5, a circuit 500 includes a first cosine bridge module 502 and a first sine bridge module 504 corresponding to outputs of a first bridge structure and a second cosine bridge module 506 and a second sine bridge module 508 corresponding to outputs of a second bridge structure. The circuit 500 further includes a third cosine bridge module 510 and a third sine bridge module 512 corresponding to outputs of a third bridge structure and a fourth cosine bridge module 514 and a fourth sine bridge module 516 corresponding to outputs of a fourth bridge structure.

Circuit 500 can be coupled to or a component of angle sensor 200 of FIG. 2 and can be configured to process output signals (sinusoidal and cosinusoidal signals) generated by first, second, third and fourth bridge structures 202, 212, 222, 232 to generate an output signal indicative of a direction of magnetic field measured by first, second, third and fourth bridge structures 202, 212, 222, 232.

In an embodiment, first cosine bridge module 502, first sine bridge module 504, second cosine bridge module 506 and second sine bridge module 508, third cosine bridge module 510, third sine bridge module 512, fourth cosine bridge module 514 and fourth sine bridge module 516 can correspond to the outputs of first cosine bridge 206, first sin bridge 204, second cosine bridge 216 and a second sine bridge 214, third cosine bridge 226, third sin bridge 224, fourth cosine bridge 236 and fourth sine bridge 234 of FIG. 2, respectively.

As illustrated in FIG. 5, an output of first cosine bridge module 502 is coupled to a first input of a first arctangent module 520 and an output of first sine bridge module 504 is coupled to a second input of the first arctangent module 520. In an embodiment, the output of the first cosine bridge module 502 can be a first cosinusoidal signal and the output of first sine bridge module 504 can be a first sinusoidal signal. First arctangent module 520 can be compute a first arctangent value based on the first sinusoidal signal and the first cosinusoidal signal.

An output of first arctangent module 520 is coupled to a first input of a summing module 550 to provide the first arctangent value.

An output of second cosine bridge module 506 is coupled to a first input of a second arctangent module 522 and an output of second sine bridge module 508 is coupled to a second input of the second arctangent module 522. In an embodiment, the output of the second cosine bridge module 506 can be a second cosinusoidal signal and the output of second sine bridge module 508 can be a second sinusoidal signal. Second arctangent module 522 can compute a second arctangent value based on the second sinusoidal signal and the second cosinusoidal signal.

An output of second arctangent module 522 is coupled to a first input of a first differencing element 532 to provide the second arctangent value. A second input of first differencing element 532 is coupled to receive a first tilt angle 542. The first tilt angle 542 can be a positive or negative angle value.

The first, second, and third tilt angles 542, 544, 546 may correspond to the tilt angles between bridges or axes of different bridge structures (e.g., tilt angles 253, 257, 263, 267 of FIG. 2B). For example, first tilt angle 542 can correspond to an angle difference between a bridge or an axis of the first bridge structure and a bridge or axis of the second bridge structure (or any other bridge structure). In an embodiment, the first tilt angle 542 may correspond to the angles that third and fourth axes 254, 258 of the second bridge structure 212 of FIG. 2 are tilted at with respect to the first and second axes 250, 252 of the first bridge structure 202 of FIG. 2, respectively. Stated differently, the first tilt angle 542 can correspond to an angle between first axis 250 and third axis 254 of FIG. 2 and/or an angle between second axis 252 and fourth axis 258 of FIG. 2. Second and third tilt angle 544, 546 will be described in greater detail below.

The first differencing element 532 can apply the first tilt angle 542 to the second arctangent value to generate a first differencing value. In some embodiments, the first differencing element 532 can subtract the first tilt angle 542 from the second arctangent value to generate the first differencing value. In other embodiments, the first differencing element 532 can add a negative first tilt angle 542 to the second arctangent value to generate the first differencing value.

An output of the first differencing element 532 can be coupled to a second input of the summing module 550.

An output of third cosine bridge module 510 is coupled to a first input of a third arctangent module 524 and an output of third sine bridge module 512 is coupled to a second input of the third arctangent module 524. In an embodiment, the output of the third cosine bridge module 510 can be a third cosinusoidal signal and the output of third sine bridge module 512 can be a third sinusoidal signal. Third arctangent module 524 can be compute a third arctangent value based on the third sinusoidal signal and the third cosinusoidal signal.

An output of third arctangent module 524 is coupled to a first input of a second differencing element 534 to provide the third arctangent value. A second input of second differencing element 534 is coupled to receive a second tilt angle 544. The second tilt angle 544 can be a positive or negative angle value.

Second tilt angle 544 can correspond to an angle difference between a bridge or an axis of the first bridge structure and a bridge or axis of the third bridge structure (or any other bridge structure). In an embodiment, the second tilt angle 542 may correspond to the angles that fifth and sixth axes 260, 262 of the third bridge structure 222 of FIG. 2 are tilted at with respect to the first and second axes 250, 252 of the first bridge structure 202 of FIG. 2, respectively. Stated differently, the second tilt angle value 544 can correspond to an angle between first axis 250 and fifth axis 260 of FIG. 2 and/or an angle between second axis 252 and sixth axis 262 of FIG. 2.

The second differencing element 534 can apply the second tilt angle 544 to the third arctangent value to generate a second differencing value. In some embodiments, the second differencing element 534 can subtract the second tilt angle 544 from the third arctangent value to generate the second differencing value. In other embodiments, the second differencing element 534 can add a negative second tilt angle 544 to the third arctangent value to generate the second differencing value.

An output of the second differencing element 534 can be coupled to a third input of the summing module 550.

An output of fourth cosine bridge module 514 is coupled to a first input of a fourth arctangent module 526 and an output of fourth sine bridge module 516 is coupled to a second input of the fourth arctangent module 526. In an embodiment, the output of the fourth cosine bridge module 514 can be a fourth cosinusoidal signal and the output of fourth sine bridge module 516 can be a fourth sinusoidal signal. Fourth arctangent module 526 can compute a fourth arctangent value based on the fourth sinusoidal signal and the fourth cosinusoidal signal.

An output of fourth arctangent module 526 is coupled to a first input of a third differencing element 536 to provide the fourth arctangent value. A second input of third differencing element 536 is coupled to receive a third tilt angle 546. The third tilt angle value 546 can be a positive or negative angle value.

Third tilt angle 546 can correspond to an angle difference between a bridge or an axis of the first bridge structure and a bridge or axis of the fourth bridge structure (or any other bridge structure). In an embodiment, the third tilt angle 546 may correspond to the angles that seventh and eighth axes 264, 268 of the fourth bridge structure 232 of FIG. 2 are tilted at with respect to the first and second axes 250, 252 of the first bridge structure 202 of FIG. 2, respectively. Stated differently, the third tilt angle 546 can correspond to an angle between first axis 250 and seventh axis 264 of FIG. 2 and/or an angle between second axis 252 and eighth axis 268 of FIG. 2. In some embodiments, third tilt angle 546 can be equal to the combination of the first tilt angle 542 and the second tilt angle 544.

The third differencing element 536 can apply the third tilt angle 546 to the fourth arctangent value to generate a third differencing value. In some embodiments, the third differencing element 536 can subtract the third tilt angle 546 from the fourth arctangent value to generate the third differencing value. In other embodiments, the third differencing element 536 can add a negative third tilt angle 546 to the fourth arctangent value to generate the third differencing value.

An output of the third differencing element 536 can be coupled to a fourth input of the summing module 550.

The summing module 550 can receive the first arctangent value, and the first, second and third differencing values and compute a mean value of the first arctangent value, and the first, second and third differencing values. In an embodiment, the mean value can correspond to the direction of the magnetic field. Thus, the output of summing module 550 is an output signal 552 that is indicative of the direction of the magnetic field.

Figure 6:
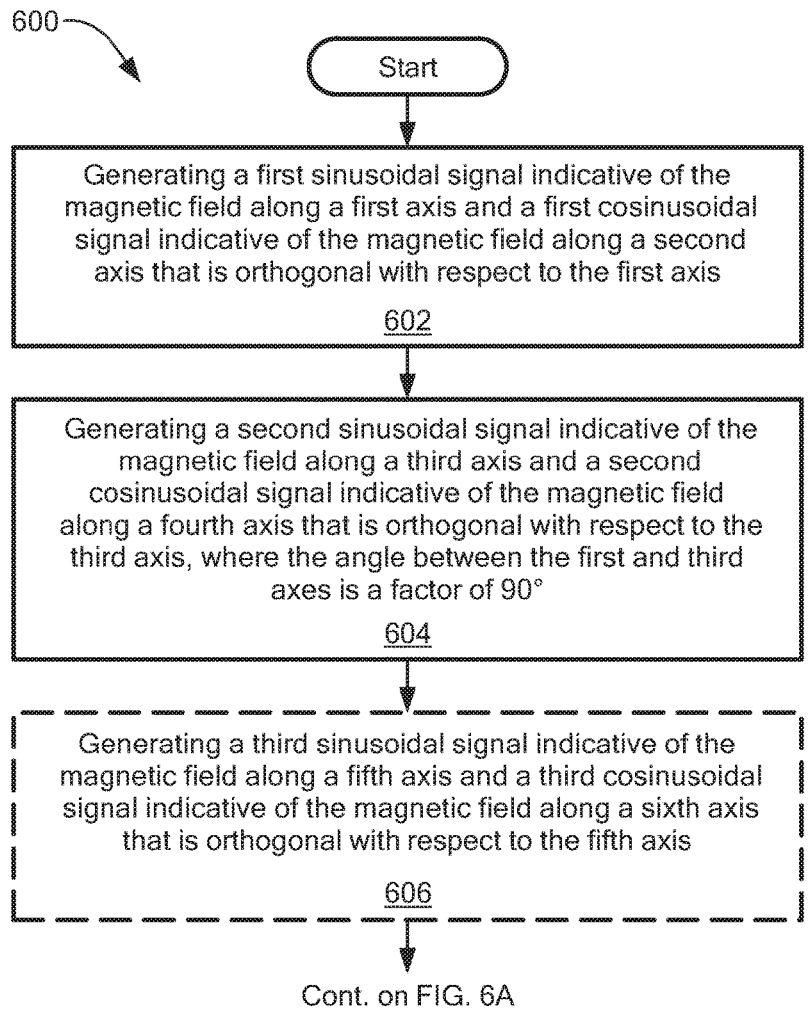
FIGS. 6-6A are a flow diagram of a method for detecting a direction of a magnetic field.
Figure 6A:
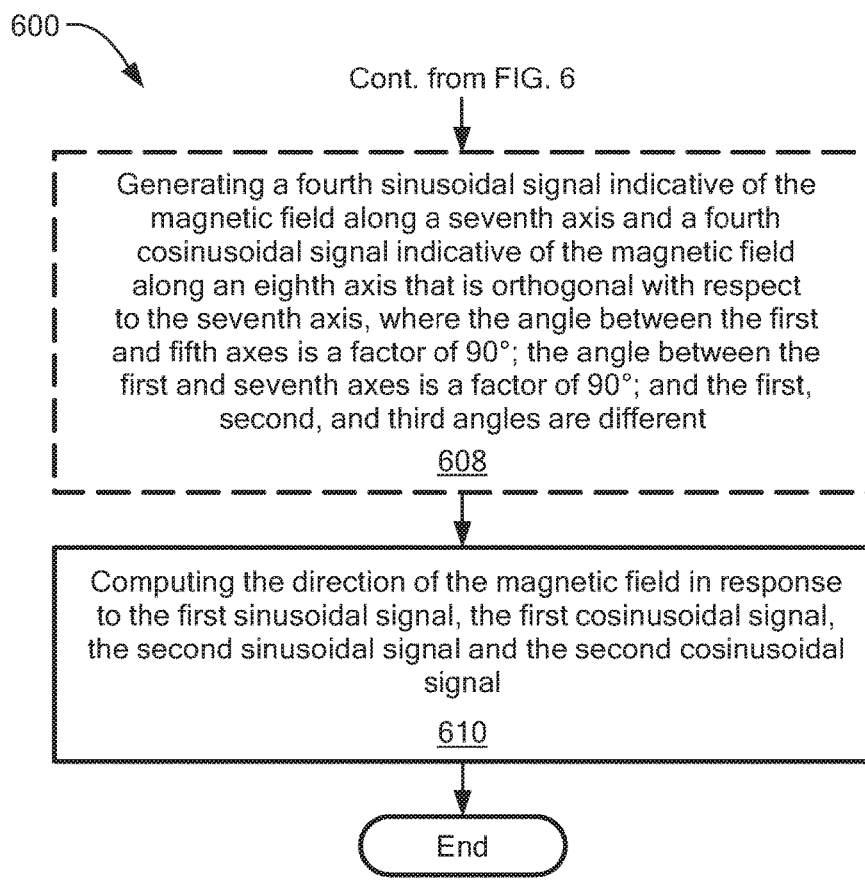

Now referring to FIG. 6, a method 600 for detecting a direction of a magnetic field begins at block 602, by generating a first sinusoidal signal indicative of the magnetic field along a first axis and a first cosinusoidal signal indicative of the magnetic field along a second axis. In an embodiment, the first axis can be orthogonal with respect to the second axis. For example, an angle between the first axis and the second axis can be approximately 90°.

At block 604, a second sinusoidal signal indicative of the magnetic field along a third axis and a second cosinusoidal signal indicative of the magnetic field along a fourth axis can be generated. In an embodiment, the third axis can be orthogonal with respect to the fourth axis. For example, an angle between the third axis and the fourth axis can be approximately 90°.

The angle sensor can include a plurality of bridge structures having one or more magnetoresistance elements that are oriented to sense the magnetic field along different axes. In an embodiment, each bridge structure can be configured to measure properties of the magnetic field along at least two different axes.

The angle sensor can include a first bridge structure and a second bridge structure. The first bridge structure can include a first sine bridge disposed relative to or along the first axis and a first cosine bridge disposed relative to or along the second axis. The second bridge structure can include a second sine bridge disposed relative to or along the third axis and a second cosine bridge disposed relative to or along the fourth axis.

The first sine bridge, first cosine bridge, second sine bridge and second cosine bridge can include a plurality of magnetoresistance elements to sense properties of the magnetic field. The plurality of magnetoresistance elements can be disposed relative to an axis. For example, the first sine bridge can include a first plurality of magnetoresistance elements disposed relative to the first axis, the first cosine bridge can include a second plurality of magnetoresistance elements disposed relative to the second axis, the second sine bridge can include a third plurality of magnetoresistance elements disposed relative to the third axis, and the second cosine bridge can include a fourth plurality of magnetoresistance elements disposed relative to the fourth axis.

Each bridge structure can include a sine bridge and a cosine bridge disposed orthogonal with respect to each other (e.g., an angle between the sine bridge and cosine bridge is approximately 90°). Thus, the first axis can be orthogonal with respect to the second axis and the third axis can be orthogonal with respect to the fourth axis.

The axes of different bridge structures can be disposed at different angles (e.g., tilt angles) relative to each other to sense the magnetic field at different angles. By measuring the magnetic field at different angles, an angle error of the angle sensor can be reduced. For example, the angle error of each bridge structure can be periodic. However, the angle error of the first bridge structure can be opposite the angle error of the second bridge structure based in part on an angle of tilt between their respective axes. The angle error of the respective bridges can cancel or otherwise reduce an overall angle error percentage of the angle sensor when averaged or combined together. Thus, by measuring the magnetic field at different angles, an angle sensor having multiple bridge structures can reduce its respective angle error by a factor associated with the number of bridge structures.

At block 606, a third sinusoidal signal indicative of the magnetic field along a fifth axis and a third cosinusoidal signal indicative of the magnetic field along a sixth axis can be generated. In an embodiment, the fifth axis can be orthogonal with respect to the sixth axis. For example, an angle between the fifth axis and the sixth axis can be approximately 90°.

At block 608, a fourth sinusoidal signal indicative of the magnetic field along a seventh axis and a fourth cosinusoidal signal indicative of the magnetic field along an eighth axis can be generated. In an embodiment, the seventh axis can be orthogonal with respect to the eighth axis. For example, an angle between the seventh axis and the eighth axis can be approximately 90°.

It should be appreciated that the angle sensors described herein may include any number of bridge structures. For example, the angle sensors described herein may include two bridge structures, four bridge structures or more than four bridge structures. The number of bridge structures in an angle sensor can be selected based at least in part on a particular application of the angle sensor. For example, blocks 606 and 608 of method 600 may be optional. In some embodiments, blocks 606 and/or 608 may be included in method 600. However, in other embodiments, method 600 may include blocks 602, 604 and 610, and thus not include one or more of blocks 606 and 608.

The axis that a respective bridge is positioned along can be disposed at a variety of different angles with respect to each other. For example, bridges and axes within the same bridge structure (e.g., first sine bridge and first cosine bridge of the first bridge structure) can be disposed such that they are orthogonal to each other. In an embodiment, an angle between a sine bridge and a cosine bridge of the same bridge structure can be approximately 90°.

Bridges and axes of different bridge structures can be disposed with respect to each other at a variety of different tilt angles. A tilt angle may refer to an axis of a first bridge structure and an axis of a second, different bridge structure and/or an angle between a sine bridge of a first bridge structure and a sine bridge of a second, different bridge structure. In some embodiments, the tilt angle can include factors of approximately 90°, such as but not limited to, approximately 90°, approximately 45°, approximately 22.5°, and approximately 11.25°.

The bridges and axes of different bridge structures can be positioned such that they are evenly spaced in terms of the tilt angle with respect to each other. For example, in an angle sensor having four bridge structures, a tilt angle between the different bridges (and axes) of the four different bridge structures can include factors of approximately 22.5°. In such an embodiment, a tilt angle between a first sine bridge (of first axis) of a first bridge structure and a second sine bridge (or third axis) of a second bridge structure can be approximately 45°, a tilt angle between the first sine bridge (of first axis) of a first bridge structure and a third sine bridge (or fifth axis) of a third bridge structure can be approximately 22.5°, and a tilt angle between the first sine bridge (of first axis) of a first bridge structure and a fourth sine bridge (or seventh axis) of a fourth bridge structure can be approximately 67.5°. It should be appreciated that the tilt angle between axes of different bridge structures can be selected based at least in part on the particular application of an angle sensor and the tilt angles may include any angle between about −90° to about 90°.

The tilt angle can be selected based at least in part on the number of bridge structures in the particular angle sensor and a desired angle error reduction.

In some embodiments, a pinning factor of a reference layer of the respective angle sensor can be modified or the reference layer can be formed having a predetermined pinning factor of the reference layer. For example, an absolute angle error for an angle sensor can be reduced by increasing a pinning factor of a reference layer of the respective angle sensor. As the pinning factor of the reference layer of the respective angle sensor is increased, the absolute angle error can be correspondingly reduced (see FIG. 3). The pinning factor can be measured in kilo Oersted units (kOe).

For example, each bridge structure described here can include a plurality of magnetoresistance elements. Each of the magnetoresistance elements can include a reference layer and a free layer. A pinning (or pinning factor) of the reference layer can range from about 1 kOe to about 3 kOe. In some embodiments, a pinning (or pinning factor) of the reference layer can range from about 1.2 kOe to about 2.5 kOe. It should be appreciated however that the pinning (or pinning factor) of the reference layer can vary based at least in part on an application of the angle sensor. For example, in some embodiments, the pinning (or pinning factor) of the reference layer can be less than 1 kOe or greater than 3 kOe.

The properties of one or more layers of a magnetoresistance element making up one or more bridges of a bridge structure can be modified to increase the layers respective pinning factor. In some embodiments, properties of one or more layers of a magnetoresistance element making multiple bridges and/or multiple bridge structure can be modified to increase the layers respective pinning factor. For example, a shape and/or thickness of the respective layer can be modified to increase the layers respective pinning factor.

The pinning factor can be modified (or generated) by at least two different techniques. In some embodiments, the pinning factor can be modified (or generated) using synthetic antiferromagnet (SAF). In other embodiments, the pinning factor can be modified (or generated) by modifying the pinning between a pinned layer and a pinning layer. For example, to increase the pinning factor between the pinned layer and the pinning layer, the coupling between the pinned layer and the pinned layer can be strengthened by reducing the thickness of a spacer layer disposed proximate to the pinned layer and distal from the pinning layer or by changing the material of the respective spacer layer. In some embodiments, the surface of the substrate that a magnetic field sensing element is disposed upon can be smoothed out or a roughness of the surface of the substrate can be reduced such that additional coupling can counteract the coupling through the spacer layer. The thickness and magnetization of the pinned layer and a second, different pinned layer (separated from the first pinned layer by the spacer layer) can be balanced to balance the SAF such that the magnetic field (e.g., magnetic field flux lines) emitted by first pinned layer can be compensated by the second pinned layer. In some embodiments, the thickness of the pinning layer can be increased to strengthen the anisotropy of the pinning layer.

The pinning factor of one or more layers of a magnetoresistance element making up one or bridges of a bridge structure can be selected based at least in part on a desired angle error reduction.

In some embodiments, the number of bridge structures and/or the pinning factor of a reference layer of one or more of the bridge structures of a particular angle sensor can be increased to reduce absolute angle error of the respective angle sensor. For example, as the pinning factor increases, the absolute angle error decreases. Further, as the number of bridge structures within an angle sensor increases, the absolute angle error decreases. Therefore, by increasing a pinning factor of an angle sensor, increasing the number of bridge structures within an angle sensor or a combination of both, the angle error can be reduced.

At block 610, the direction of the magnetic field can be computed in response to at least the first sinusoidal signal, the first cosinusoidal signal, the second sinusoidal signal, and the second cosinusoidal signal.

In an embodiment, the number of sinusoidal signals and cosinusoidal signals used to determine the direction of the magnetic field can correspond to the number of bridge structures of a particular angle sensor. For example, for an angle sensor having four bridge structures, the direction of the magnetic field can be computed in response to at least the first sinusoidal signal, the first cosinusoidal signal, the second sinusoidal signal, the second cosinusoidal signal, the third sinusoidal signal, the third cosinusoidal signal, the fourth sinusoidal signal, and the fourth cosinusoidal signal.

The angle sensor can be coupled to a circuit or the angle sensor can include a circuit (e.g., circuit 400 of FIG. 4, circuit 500 of FIG. 5) configured to determine the direction of the magnetic field using the sinusoidal signal(s) and cosinusoidal signal(s). The circuit can include one or more arctangent modules configured to generate arctangent values corresponding to the measured magnetic field using the corresponding sinusoidal signal and cosinusoidal signal.

The bridges of each bridge structure can be coupled to at least one arctangent module to provide their respective signals. For example, a sine bridge can be coupled to provide the sinusoidal signal to the arctangent module and a cosine bridge can be coupled to provide the cosinusoidal signal to the arctangent module. The arctangent module can generate an arctangent value corresponding to the measured magnetic field using the corresponding sinusoidal signal and cosinusoidal signal. The arctangent angle ($\varphi$) (or angle) from each bridge structure can be determined using the following formula:

$$\varphi = \tan^{-1}\left(\frac{U_S}{U_C}\right)$$

where $U_S$ corresponds to the sine of the measured magnetic field and the sinusoidal signal generated by the sine bridge and $U_C$ corresponds to the cosine of the measured magnetic field and the cosinusoidal signal generated by the cosine bridge.

The arctangent value angle ($\varphi$) can correspond to an angle of the measured magnetic field from a perspective of the particular bridge structure. In an embodiment, an arctangent value (angle ($\varphi$)) can be determined for each bridge structure.

The circuit can further include one or more differencing elements. The differencing elements can be coupled to outputs of the arctangent modules to generate an arctangent value (also referred to herein as a differencing value) for a bridge structure that has been tilted with respect to a first bridge structure. For example, the differencing element can be configured to apply a tilt angle between an axis of the first bridge structure and an axis of a different bridge structure (e.g., second bridge structure, third bridge structure, fourth bridge structure, etc.) to generate a differencing value. The tilt angle can be a positive or negative value. Thus, the differencing element can subtract the tilt angle from the respective arctangent value or add a negative tilt angle to the respective arctangent value. The tilt angle can vary as described above.

The output of the first arctangent module and the outputs of the one or more differencing elements can be coupled to inputs of a summing element of the circuit. In an embodiment, the summing element can determine a mean value of one or more arctangent values and/or one or more differencing values to generate an output signal indicative of the direction of the magnetic field.

For example, the summing element can determine a mean value ($\varphi_M$) using the following equation:

$$\varphi_M = \frac{1}{X}\sum_{x=1}^{X} \varphi_x - \theta_x$$

where angle $\varphi_x$ corresponds to the tilt angle value from the respective bridge structure (e.g., $\varphi_1$ corresponds to the tilt angle value from the first bridge structure, $\varphi_2$ corresponds to the tilt angle value from the second bridge structure, etc.). $\theta_x$ corresponds to the tilt angle between the first bridge structure and the respective other bridge structure ($\theta_1=0$), different from the first bridge structure. For example, $\theta_2$ corresponds to the tilt angle between the first bridge structure and the second bridge structure, $\theta_3$ corresponds to the tilt angle between the first bridge structure and the third bridge structure, and $\theta_4$ corresponds to the tilt angle between the first bridge structure and the fourth bridge structure.

X corresponds to the number of bridge structures in the respective angle sensor. For example, for an angle sensor having two bridge structures, the value of X is equal to two.

The determined mean value ($\varphi_M$) can correspond to the direction of the magnetic field and include a reduced angle error percentage corresponding to the number of bridge structures used to generate the respective mean value ($\varphi_M$).

Having described preferred embodiments, which serve to illustrate various concepts, structures and techniques, which are the subject of this patent, it will now become apparent that other embodiments incorporating these concepts, structures and techniques may be used. Accordingly, it is submitted that the scope of the patent should not be limited to the described embodiments but rather should be limited only by the spirit and scope of the following claims.

What is claimed:

1. A magnetic field angle sensor to detect a direction of a magnetic field comprising:
   a first bridge structure configured to generate a first sinusoidal signal indicative of the magnetic field along a first axis and a first cosinusoidal signal indicative of the magnetic field along a second axis that is orthogonal with respect to the first axis; and
   a second bridge structure configured to generate a second sinusoidal signal indicative of the magnetic field along a third axis and a second cosinusoidal signal indicative of the magnetic field along a fourth axis that is orthogonal with respect to the third axis, wherein an angle between the first axis and the third axis is a factor of 90°; and
   a circuit responsive to the first sinusoidal signal, the first cosinusoidal signal, the second sinusoidal signal, and the second cosinusoidal signal for computing an output signal indicative of the direction of the magnetic field;
   wherein the circuit comprises an arctangent processor to compute a first arctangent of the first sinusoidal signal and the first cosinusoidal signal and to compute a second arctangent of the second sinusoidal signal and the second cosinusoidal signal; and wherein the circuit further comprises a differencing element configured to subtract the angle between the first axis and the third axis from the second arctangent to generate a third arctangent.

2. The magnetic field angle sensor of claim 1, wherein the angle between the first axis and the third axis is approximately 45°.

3. The magnetic field angle sensor of claim 1, further comprising a substrate supporting the first and second bridge structures.

4. The magnetic field angle sensor of claim 1, wherein the circuit further comprises a summing element configured to compute a mean value of the first arctangent and the third arctangent in order to provide the output signal indicative of the direction of the magnetic field.

5. The magnetic field angle sensor of claim 1, further comprising:
a third bridge structure configured to generate a third sinusoidal signal indicative of the magnetic field along a fifth axis and a third cosinusoidal signal indicative of the magnetic field along a sixth axis that is orthogonal with respect to the fifth axis; and
a fourth bridge structure configured to generate a fourth sinusoidal signal indicative of the magnetic field along a seventh axis and a fourth cosinusoidal signal indicative of the magnetic field along an eighth axis that is orthogonal with respect to the seventh axis; and
wherein the angle between the first axis and the third axis provides a first angle, a second angle between the fifth axis and the first axis is a factor of 90°, a third angle between the seventh axis and the first axis is a factor of 90° and wherein the first angle, the second angle and the third angle are different angles.

6. The magnetic field angle sensor of claim 5, wherein the first angle is approximately 45°, the second angle is approximately 22.5°, and the third angle is approximately 67.5°.

7. The magnetic field angle sensor of claim 1, wherein the first bridge structure comprises a first plurality of magnetoresistance elements oriented to sense the magnetic field along the first axis and a second plurality of magnetoresistance elements oriented to sense the magnetic field along the second axis, and the second bridge structure comprises a third plurality of magnetoresistance elements oriented to sense the magnetic field along the third axis and a fourth plurality of magnetoresistance elements oriented to sense the magnetic field along the fourth axis.

8. The magnetic field angle sensor of claim 7, wherein the first, second, third, and fourth, pluralities of magnetoresistance elements comprise one or more of giant magnetoresistance (GMR) elements, anisotropic magnetoresistance (AMR) elements, tunneling magnetoresistance (TMR) elements or magnetic tunnel junction (MTJ) elements.

9. The magnetic field angle sensor of claim 7, wherein each of the first, second, third, and fourth pluralities of magnetoresistance elements comprise a reference layer and a free layer.

10. A method for detecting a direction of a magnetic field, the method comprising:
using a first bridge structure, generating a first sinusoidal signal indicative of the magnetic field along a first axis and a first cosinusoidal signal indicative of the magnetic field along a second axis that is orthogonal with respect to the first axis; and
using a second bridge structure, generating a second sinusoidal signal indicative of the magnetic field along a third axis and a second cosinusoidal signal indicative of the magnetic field along a fourth axis that is orthogonal with respect to the third axis, wherein an angle between the first axis and the third axis is a factor of 90°; and
using a circuit having an arctangent processor and a differencing element, computing the direction of the magnetic field in response to the first sinusoidal signal, the first cosinusoidal signal, the second sinusoidal signal, and the second cosinusoidal signal;
wherein computing the direction of the magnetic field comprises determining a first arctangent of the first sinusoidal signal and the first cosinusoidal signal, and determining a second arctangent of the second sinusoidal signal and the second cosinusoidal signal; and
wherein computing the direction of the magnetic field further comprises subtracting the angle between the first axis and the third axis from the second arctangent to generate a third arctangent.

11. The method of claim 10, wherein the angle between the first axis and the third axis is approximately 45°.

12. The method of claim 10, wherein computing the direction of the magnetic field further comprises calculating a mean value of the first arctangent and the third arctangent in order to provide an output signal indicative of the direction of the magnetic field.

13. The method of claim 10, further comprising:
generating a third sinusoidal signal indicative of the magnetic field along a fifth axis and a third cosinusoidal signal indicative of the magnetic field along a sixth axis that is orthogonal with respect to the fifth axis; and
generating a fourth sinusoidal signal indicative of the magnetic field along a seventh axis and a fourth cosinusoidal signal indicative of the magnetic field along an eighth axis that is orthogonal with respect to the seventh axis;
wherein the angle between the first axis and the third axis provides a first angle, a second angle between the fifth axis and the first axis is a factor of 90°, a third angle between the seventh axis and the first axis is a factor of 90° and wherein the first angle, the second angle and the third angle are different angles.

14. The method of claim 13, wherein the first angle is approximately 45°, the second angle is approximately 22.5°, and the third angle is approximately 67.5°.

15. The method of claim 13, wherein:
generating the first sinusoidal signal comprises sensing the magnetic field along the first axis with a first plurality of magnetoresistance elements of the first bridge structure;
generating the first cosinusoidal signal comprises sensing the magnetic field along the second axis by a second plurality of magnetoresistance elements of the first bridge structure, wherein the second plurality of magnetoresistance elements are positioned orthogonally with respect to the first plurality of magnetoresistance elements;
generating the second sinusoidal signal comprises sensing the magnetic field along the third axis by a third plurality of magnetoresistance elements of the second bridge structure;
generating the second cosinusoidal signal comprises sensing the magnetic field along the fourth axis by a fourth plurality of magnetoresistance elements of the second bridge structure, wherein the fourth plurality of magnetoresistance elements are positioned orthogonally with respect to the third plurality of magnetoresistance elements; and wherein each of the first, second, third, and fourth pluralities of magnetoresistance elements comprise a reference layer and a free layer.

16. A magnetic field angle sensor to detect a direction of a magnetic field comprising:
   first means for generating a first sinusoidal signal indicative of the magnetic field along a first axis and a first cosinusoidal signal indicative of the magnetic field along a second axis that is orthogonal with respect to the first axis; and
   second means for generating a second sinusoidal signal indicative of the magnetic field along a third axis and a second cosinusoidal signal indicative of the magnetic field along a fourth axis that is orthogonal with respect to the third axis, wherein an angle between the first axis and the third axis is a factor of 90°; and
   means for computing the direction of the magnetic field in response to the first sinusoidal signal, the first cosinusoidal signal the second sinusoidal signal, and the second cosinusoidal signal;
   wherein the computing means comprises means for determining a first arctangent of the first sinusoidal signal and the first cosinusoidal signal and a second arctangent of the second sinusoidal signal and the second cosinusoidal signal; and
   wherein the computing means further comprises a means for subtracting the angle between the first axis and the third axis from the second arctangent to generate a third arctangent.

17. The magnetic field angle sensor of claim 16, wherein the angle between the first axis and the third axis is approximately 45°.

18. The magnetic field angle sensor of claim 16, further comprising means for supporting the first and second generating means.

19. The magnetic field angle sensor of claim 16, wherein the computing means further comprises means for calculating a mean value of the first arctangent and the third arctangent in order to provide an output signal indicative of the direction of the magnetic field.

20. The magnetic field angle sensor of claim 16, further comprising:
   third means for generating a third sinusoidal signal indicative of the magnetic field along a fifth axis and a third cosinusoidal signal indicative of the magnetic field along a sixth axis that is orthogonal with respect to the fifth axis; and
   fourth means for generating a fourth sinusoidal signal indicative of the magnetic field along a seventh axis and a fourth cosinusoidal signal indicative of the magnetic field along an eighth axis that is orthogonal with respect to the seventh axis;
   wherein the angle between the first axis and the third axis provides a first angle, a second angle between the fifth axis and the first axis is a factor of 90°, a third angle between the seventh axis and the first axis is a factor of 90° and wherein the first angle, the second angle and the third angle are different angles.

21. The magnetic field angle sensor of claim 20, wherein the first angle is approximately 45°, the second angle is approximately 22.5°, and the third angle is approximately 67.5°.

22. The magnetic field angle sensor of claim 16, wherein:
   the first generating means comprises a first bridge structure comprising a first plurality of magnetoresistance elements to sense the magnetic field along the first axis and a second plurality of magnetoresistance elements to sense the magnetic field along the second axis; and
   the second generating means comprises a second bridge structure comprising a third plurality of magnetoresistance elements to sense the magnetic field along the third axis and a fourth plurality of magnetoresistance elements to sense the magnetic field along the fourth axis.

23. The magnetic field angle sensor of claim 22, wherein each of the first, second, third, and fourth pluralities of magnetic field sensing elements comprise one or more of giant magnetoresistance (GMR) elements, anisotropic magnetoresistance (AMR) elements, tunneling magnetoresistance (TMR) elements or magnetic tunnel junction (MTJ) elements.

24. The magnetic field angle sensor of claim 22, wherein each of the first, second, third and fourth pluralities of magnetoresistance elements comprise a reference layer and a free layer.

* * * * *

UNITED STATES PATENT AND TRADEMARK OFFICE
CERTIFICATE OF CORRECTION

Page 1 of 2

PATENT NO. : 10,557,726 B2
APPLICATION NO. : 15/884619
DATED : February 11, 2020
INVENTOR(S) : Rémy Lassalle-Balier It is certified that error appears in the above-identified patent and that said Letters Patent is hereby corrected as shown below:

In the Specification

Column 2, Line 5, delete "titled" and replace with --tilted--.

Column 2, Line 23, delete "titled" and replace with --tilted--.

Column 4, Line 44, delete "The method can further include" and replace with --In some embodiments,--.

Column 4, Line 54, delete "The method can include" and replace with --In some embodiments,--.

Column 9, Line 58, delete "or directions" and replace with --of directions--.

Column 10, Line 44, delete "can by" and replace with --can be--.

Column 12, Line 7, delete "and an angle" and replace with --an angle--.

Column 12, Line 22, delete "titled" and replace with --tilted--.

Column 13, Line 6, delete "titled" and replace with --tilted--.

Column 13, Line 8, delete "titled" and replace with --tilted--.

Column 13, Line 56, delete "pining" and replace with --pinning--.

Column 14, Line 60, delete "can be compute" and replace with --can compute--.

Column 15, Line 56, delete "sin" and replace with --sine--.

Column 15, Line 58, delete "sin" and replace with --sine--.

Signed and Sealed this
Twenty-second Day of September, 2020

Andrei Iancu
*Director of the United States Patent and Trademark Office*

Column 20, Line 24, delete "layers" and replace with --layers'--.

Column 20, Line 28, delete "layers" and replace with --layers'--.

Column 20, Line 30, delete "layers" and replace with --layers'--.